(12) United States Patent
Usui et al.

(10) Patent No.: US 6,389,220 B2
(45) Date of Patent: *May 14, 2002

(54) INFORMATION SIGNAL DUPLICATION CONTROL SYSTEM

(75) Inventors: Takashi Usui, Tokyo; Takehiro Sugita, Kanagawa; Akira Ogino, Chiba, all of (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/989,792

(22) Filed: Dec. 12, 1997

(30) Foreign Application Priority Data

Jan. 13, 1997 (JP) ............................ P09-015828

(51) Int. Cl.[7] ............................ H04N 5/913; H04N 5/76
(52) U.S. Cl. .......................... 386/94; 386/95; 360/15
(58) Field of Search ....................... 386/94, 95, 46, 386/1; 375/200; 380/3, 4, 5, 9, 10; 360/15, 60; H04N 5/913, 5/76

(56) References Cited

U.S. PATENT DOCUMENTS 3,984,624 A  10/1976  Waggener
5,989,977 A * 11/1999 Naruse et al. ................ 386/64
6,023,551 A *  2/2000 Sugita et al. ................. 386/94

FOREIGN PATENT DOCUMENTS

| EP | 0360615 | 3/1990 | |
| EP | 0400906 | 12/1990 | |
| EP | 0574892 | 12/1993 | |
| EP | 0838949 | 4/1998 | H04N/5/913 |
| EP | 0843474 | 5/1998 | |
| EP | 0848551 | 6/1998 | H04N/5/913 |

* cited by examiner

Primary Examiner—Robert Chevalier
(74) Attorney, Agent, or Firm—Jay H. Maioli

(57) ABSTRACT

A spread code generation section outputs selectively one of a plurality of different spectral spread codes corresponding to an anti-duplication control signal for indicating the content of the duplication prevention control such as duplication permission, duplication inhibition, and duplication of generation restriction of a video signal in a recording medium. The plurality of spectral spread codes is different in phase or series, or generated by multiplying a specified spread code by the plurality of different orthogonal codes. An additional information signal is spectrally spread using the selected spread code, and superimposed on the video signal to output a combined information signal. The spectral spread code in the combined information signal is detected, duplication control of the video signal in the recording medium is performed correspondingly to the detected spectral spread code, and the additional information is extracted by performing inversion spectral spread on the combined information signal using the detected spectral spread code.

53 Claims, 21 Drawing Sheets

F I G. 3
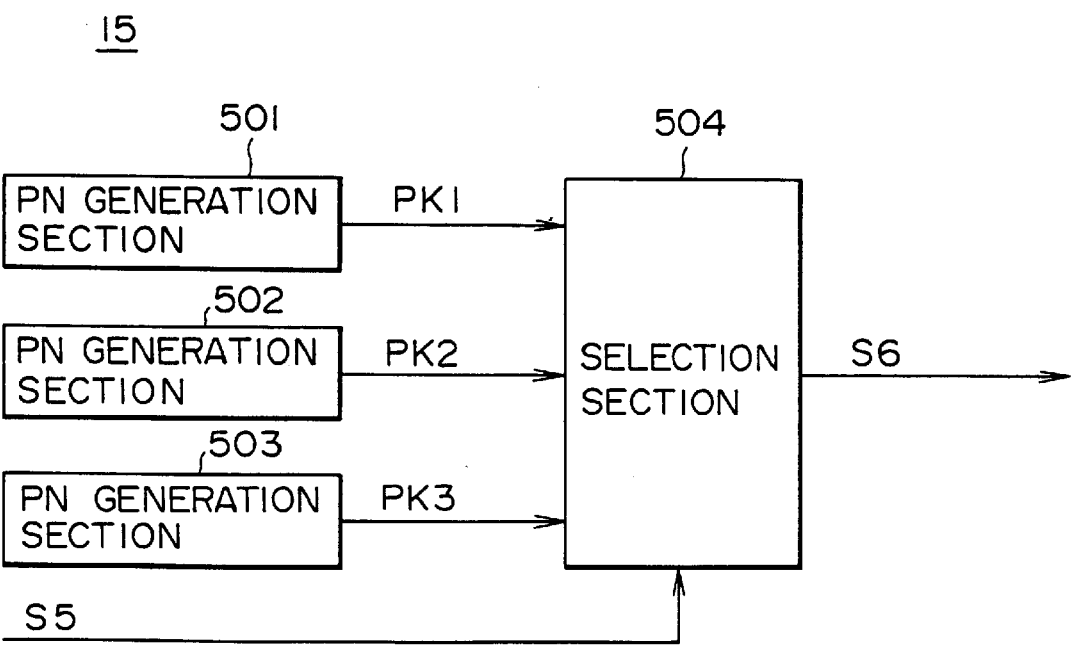

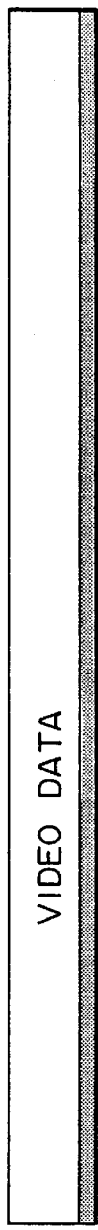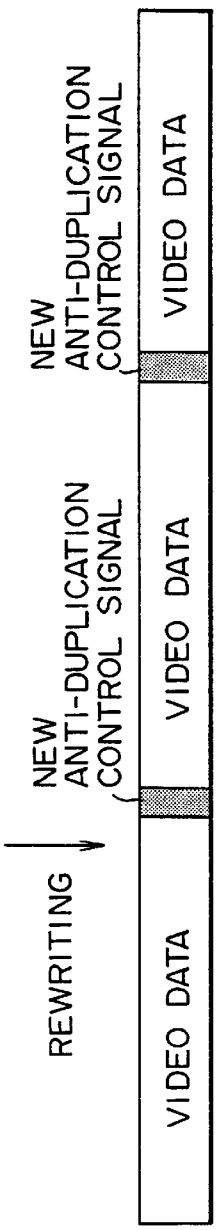

FIG. 6A  VIDEO SIGNAL S21

FIG. 6B  CORRESPOND EXTRACTED ANTI-DUPLICATION CONTROL SIGNAL TO NEW ANTI-DUPLICATION CONTROL SIGNAL

| EXTRACTED ANTI-DUPLICATION CONTROL SIGNAL | | MEANING | NEW ANTI-DUPLICATION CONTROL SIGNAL | PERMISSION OF COPY (RECORDING DEVICE) |
|---|---|---|---|---|
| 0 | 0 | COPY INHIBITION | 0 AS IT IS 0 | INHIBITION |
| 0 | 1 | PERMISSION OF ONE COPY | 0 AND OVERRIDING | PERMISSION |
| 1 | 0 | PERMISSION OF TWO COPIES | 0 AND OVERRIDING | PERMISSION |
| 1 | 1 | PERMISSION OF FREE COPY | 1 AS IT IS 1 | PERMISSION |

FIG. 6C  DATA WRITTEN IN RECORDING MEDIUM

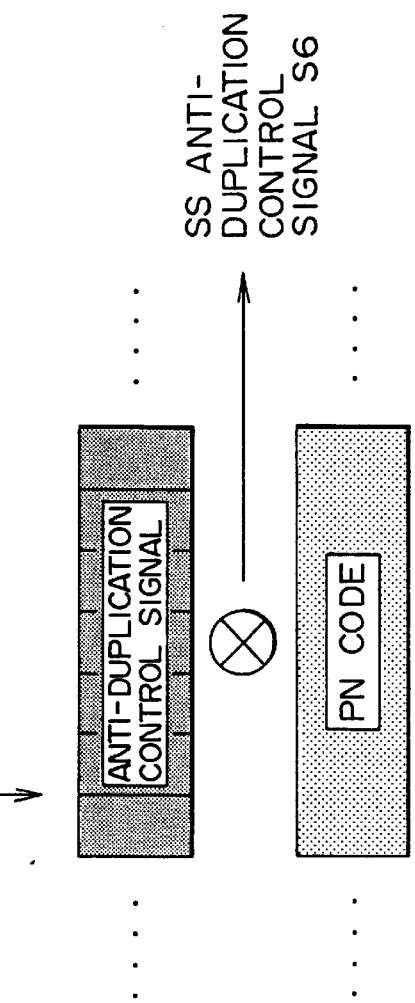
FIG. 7A VIDEO SIGNAL COMPONENT S2
FIG. 7B ANTI-DUPLICATION CONTROL SIGNAL S5
FIG. 7C PN CODE STRING PS

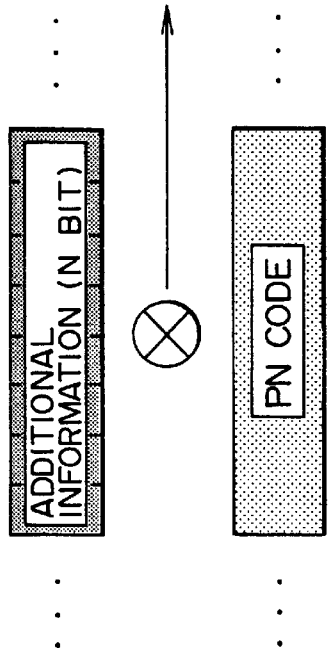
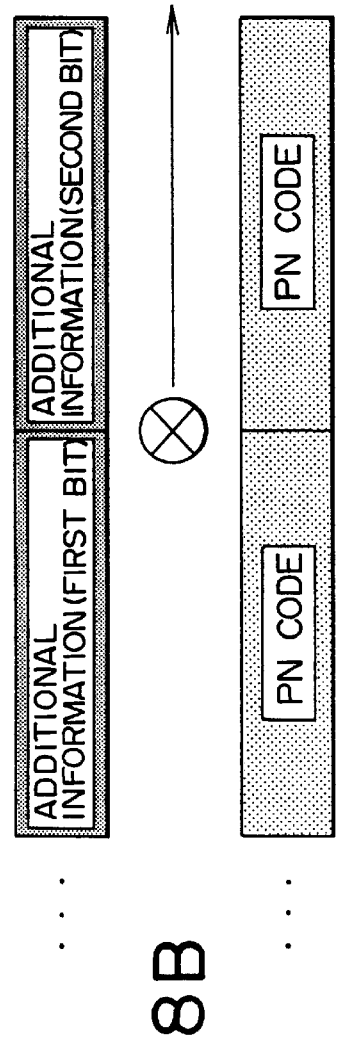
FIG. 8A
FIG. 8B

ANTI-DUPLICATION CONTROL SIGNAL
SPECTRUM BEFORE SPECTRAL SPREAD

ANTI-DUPLICATION CONTROL SIGNAL
SPECTRUM AFTER SPECTRAL SPREAD

F I G. 9C
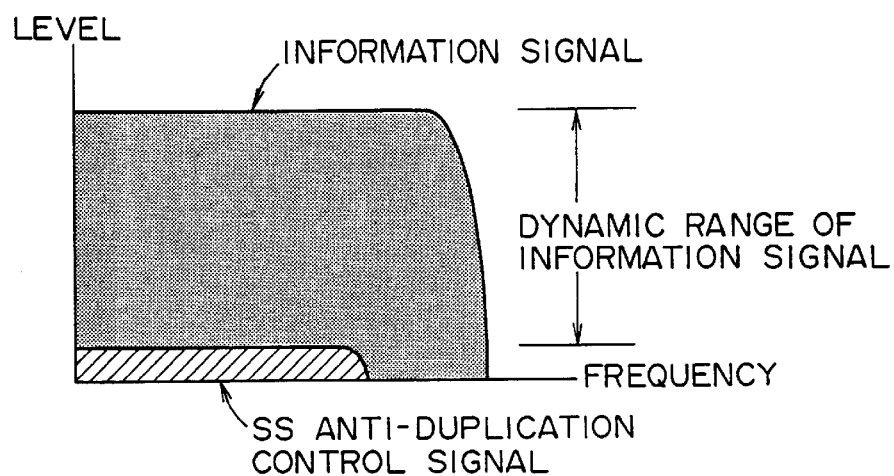
SPECTRUM OF INFORMATION SIGNAL ON WHICH SS
ANTI-DUPLICATION CONTROL SIGNAL IS SUPERIMPOSED
F I G. 9D
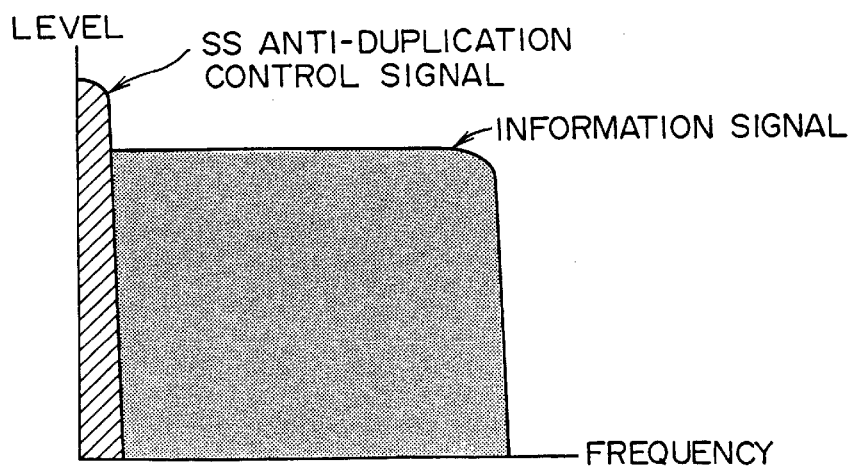
SIGNAL SPECTRUM AFTER SPECTRAL INVERSION SPREAD
IN RECORDING DEVICE SIDE

INFORMATION SIGNAL DUPLICATION CONTROL SYSTEM

BACKGROUND OF THE INVENTION

1. Field of the Invention

This invention relates to a method, device, and information signal recording medium for duplication control, for example, in which a video signal recorded in a recording medium is played back, the played back video signal is transmitted with information for preventing duplication together, the transmitted information signal is received to control or inhibit the recording of the information signal in another recording medium.

2. Description of Related Art

VTR (Video Tape recording devices) has been popularized in daily life, and many kinds of software which can be played back on a VTR are supplied abundantly. Digital VTR or DVD (Digital Video Disks) playback devices have been available commercially, and provide images and sound of exceptionally high quality.

On the other hand, there is, however, a problem in that this great abundance of software can be copied without restriction, and several methods have already been proposed to inhibit duplication.

For example, though the method is a method which inhibits duplication of an analog video signal not directly, one method to prevent copying uses a difference in the AGC (Automatic Gain Control) system, or in the APC (Automatic Phase Control) system, for example, between the VTR recording device and a monitor receiver for displaying the image.

For example, the method which utilizes the difference in AGC system, in which a VTR performs AGC using a pseudo sync signal inserted in the video signal and a monitor receiver employs a different AGC system not using the pseudo sync signal, is an example of the former, in detail, when an analog video signal is recorded in an original recording medium. A very high level pseudo sync signal is previously inserted as a sync signal for AGC, and the very high level pseudo sync signal is inserted in the video signal to be supplied from a playback VTR to a recording VTR as a sync signal for AGC.

VTR performs APC using the phase of the color burst signal itself in the video signal and the monitor receiver employs a different APC. The method which utilizes the difference in APC is an example of the latter, in detail, the phase of the color burst signal of a video signal is previously inverted partially when the analog video signal is recorded in an original recording medium, and the color burst signal having partially inverted phase is outputted as a video signal to be supplied from a playback VTR to a recording VTR.

As the result, the monitor receiver which receives the analog video signal from the playback VTR plays back the image correctly without being affected by the pseudo sync signal in AGC or without desired affection of the partial phase inversion of the color burst signal used for APC.

On the other hand, in a VTR, which is supplied with the analog video signal from the playback VTR into which pseudo sync signals have been inserted or which has been subjected to color burst signal phase inversion control as described herein above, for receiving such analog video signal and for recording the analog video signal in a recording medium, proper gain control or phase control based on the input signal cannot be performed, and so the video signal is not correctly recorded. Even if this signal is played back, therefore, normal picture and sound cannot be obtained.

As described herein above, in the case that involves an analog video signal, the prevention is not a method for directly inhibiting duplication but is a method for viewing an abnormally played back picture which can not viewed normally. Such prevention method is a passive duplication prevention control.

On the other hand, in the case that digitized information, for example, video signal is involved, an anti-duplication signal or an anti-duplication control signal comprising, for example, a duplication ranking control code, is added as digital data to the video signal and recorded on the recording medium, so as to prevent or control duplication of the image.

FIG. 1 is a basic structural diagram of a duplication apparatus for duplicating digitized information, a digital information played back by the digital playback device 110 is sent to a digital recording device 120 through a digital transmission line 101, and the digital recording device 101 duplicates the digital information if duplication is permitted and does not duplicate the digital information if duplication is not permitted.

An anti-duplication control information in the form of additional information is recorded in a recording medium 111 placed on the digital playback device 110 in addition to a digital main information. The anti-duplication control information indicates control content such as duplication inhibition, duplication permission, or generation restriction. The digital playback section 113 reads out the information from the recording medium 111, acquires the anti-duplication control information together with the digital main information, and sends them to the digital recording medium 120 through the digital transmission line 101.

An anti-duplication control signal detection section 122 of the digital recording device 120 detects the anti-duplication control signal out of the information items received from the digital transmission line 101, and judges the control content. The decision result is sent to a digital recording section 121.

If the decision result of the anti-duplication control signal from the anti-duplication control signal detection section 122 indicates permission of recording of the digital information inputted through the digital transmission line 101, then the digital recording section 121 converts the input digital signal to a digital information suitable for recording, and writes it in the recording medium 123, that is, recording is performed. On the other hand; if the decision result of the anti-duplication control signal from the anti-duplication control signal detection section 122 indicates duplication inhibition, then the digital recording section 121 does not perform recording processing of the input digital information.

Further, if the decision result of the anti-duplication control signal from the anti-duplication control signal detection section 122 indicates permission of recording of only the first generation, then the digital recording section 121 converts the input digital signal to a digital information suitable for recording, and writes it in the recording medium 123, that is, recording is performed, and additionally, converts the anti-duplication control signal in the form of additional information to a signal for indicating duplication inhibition (duplication inhibition of next generation), and records it in the recording medium 123. Therefore, the video signal can not be duplicated further using the recording medium 123 in which the information is recorded.

As described herein above, in the case of digital connection that the main information signal and anti-duplication control signal added as an additional information are supplied to a recording device in the form of digital signal, because the anti-duplication control signal is contained in the digital data to be transmitted, duplication prevention control such as duplication inhibition is performed consistently in a recording device using the anti-duplication control signal.

In the case that the digital playback device in FIG. 1 is, for example, a digital VTR, to monitor the played back video signal and audio signal, only both the video signal, that is the main information signal, and audio signal are converted to an analog signal through a D/A conversion circuit 113 and guided to an analog output terminal 114 connected usually to a monitor receiver.

As described herein above, though the playback device is a device for playing back digital signals, the anti-duplication control signal is not contained in the analog signal guided to the analog output terminal 114. Therefore, in the case of analog connection in which an analog device such as analog VTR is connected to the analog output terminal 114, duplication of the main information signal is undesirably possible.

Though it is considered that the anti-duplication control signal is superimposed and added on the D/A converted video signal and audio signal, it is difficult that the anti-duplication control signal is added, extracted in a recording device, and used in duplication prevention control without deterioration of the D/A converted video signal and audio signal.

Therefore, heretofore in the case of analog connection, only the passive duplication prevention method utilizing the difference in AGC system or the difference in APC characteristics between a VTR and monitor receiver described herein above has been an available duplication prevention control method.

However, in the case of the duplication prevention control method utilizing the difference in AGC system or APC characteristics between a VTR and monitor receiver described herein above, it is possible to record the video signal normally even with the passive duplication prevention depending on the AGC system or APC characteristics of recording device side. Further, disturbance of the played back picture on the monitor receiver can be caused. These are problems in duplication prevention control.

The inventors of the present invention have proposed previously a method in which a anti-duplication control signal is spectrally spread, the spectrally spread anti-duplication control signal is superimposed on the analog video signal, and the video signal is recorded in the form of digital record or analog record (refer to U.S. patent application Ser. No. 08/75510) as a duplication prevention control method which can solve the problem described herein above and is effective for both analog connection and digital connection without deterioration of the played back picture and sound.

According to this method, a PN (Pseudorandom Noise) sequence code (referred to hereinafter as PN code) used as a spread code is generated with a sufficiently short period and spectrally spread by multiplying it by the anti-duplication control signal. In this way, a narrow-band high-level anti-duplication control signal is converted to a wide-band low-level signal which does not affect the video signal or sound signal. This spectrally spread anti-duplication control signal is then superimposed on the analog video signal, and recorded in a recording medium. In this case, the signal to be recorded in a recording medium may be an analog signal or a digital signal.

In this method, because the anti-duplication control signal is spectrally spread and superimposed on the video signal as a wide-band low-level signal, it is therefore difficult for a person who wishes to illegally duplicate the video signal to remove the anti-duplication control signal which is superimposed on it.

However, it is possible to detect and use the superimposed anti-duplication control signal by performing inversion spectral spread. This anti-duplication control signal is therefore supplied to the recording device together with the video signal. In the recording side, the anti-duplication control signal is detected, and duplication is consistently controlled according to the detected anti-duplication control signal.

In the case that generation restriction such as permission of the first generation duplication or permission of two generation duplication is performed as described herein above using this method, a plurality of different spectrally spread anti-duplication control signal can be superimposed on the same time interval of, the video signal.

For example, in the case that the anti-duplication control signal added on the first generation recording medium is an information which indicates permission of only the first generation duplication, when duplication is performed using the first generation recording medium, the anti-duplication control signal which permits only the first generation duplication is spectrally spread and superimposed on the video signal recorded in the second generation recording medium.

When duplication is performed using the second generation recording medium, in addition to the information which permits only the first generation duplication, the information (information which indicates duplication inhibition) which indicates that the video signal recorded in the second generation recording medium can not be duplicated using this second generation recording medium is spectrally spread and superimposed on the video signal.

In the case that a plurality of different spectrally spread anti-duplication control signals are superimposed on the same time interval of the video signal, it is troublesome to extract only the newest anti-duplication control signal. For example, it is required that all the plurality of anti-duplication control signals superimposed on the same time interval of the video signal is extracted and which anti-duplication control signal is the newest anti-duplication control signal is judged. Therefore it takes a significant time and work to extract the newest anti-duplication control signal.

To cope with this problem, it is considered that a cancel signal having the same level and same phase as those of the old anti-duplication control signal superimposed previously which is spectrally spread and superimposed on the video signal is generated, and by subtracting this cancel signal from the video signal on which the spectrally spread anti-duplication control signal is superimposed, the spectrally spread old anti-duplication control signal superimposed on the video signal is canceled, thereafter a new spectrally spread anti-duplication control signal is generated and superimposed on the video signal.

If the old anti-duplication control signal spectrally spread and superimposed previously on the video signal is canceled as described herein above and only one anti-duplication control signal spectrally spread and superimposed on the video signal is always involved, then the anti-duplication control signal spectrally spread and superimposed on the video signal is extracted easily. However, it is required to cancel the old anti-duplication control signal, and it take significant time and work cancel the old anti-duplication control signal, Therefore this method is also not preferable.

As described hereinbefore, in the case of transmission of analog video signals, generation restriction on the analog video signal for restricting the number of duplications requires significant time and work, and the restriction is not performed rapidly and not correctly.

In view of the above, it is the object of the present invention to provides a method, device, and information signal recording medium which are capable of performing duplication prevention control of the information signal including restriction of the number of permitted duplications rapidly and correctly.

SUMMARY OF THE INVENTION

The present invention provides an information signal duplication control system comprising an information signal output device for outputting combined information signals generated by superimposing at least anti-duplication control signals on the main information signal and an information signal recording device for recording the main information signal in a recording medium correspondingly to the anti-duplication control signal in the combined information signal, wherein the information signal output device is provided with a spread code generator for outputting selectively one of a prescribed plurality of different spectral spread codes corresponding to the anti-duplication control signal for controlling the recording of the main information signal in the recording medium, a spectral spread portion for spectrally spreading the additional information signal to generate a spectral spread code information signal using the spread code supplied form the spread code generator, and a superimposition portion for superimposing the spectral spread code information signal supplied from the spectral spread portion on the main information signal to generate the combined information signal and outputting it, and the information signal recording device is provided with a spread code detector for receiving the combined information signal and detecting the spectral spread code used for generating the spectral spread code information signal contained in the combined information signal, an inversion spectral spread portion for performing inversion spectral spread on the combined information signal using the spectral spread code supplied from the spread code detector to obtain the additional information signal, an anti-duplication control signal generator for generating an anti-duplication control signal corresponding to the spectral spread code detected by the spread code recorder, and a recorder for recording the main information signal in a recording medium correspondingly to the anti-duplication control signal.

BRIEF DESCRIPTION OF THE DRAWINGS

FIG. 3 is a block diagram for illustrating the SS anti-duplication control signal generation section of the video signal output device shown in FIG. 2.

FIGS. 6A to 6C are diagrams for describing processing of the additional information conversion section of the video signal recording device shown in FIG. 4.

FIGS. 7A to 7C are diagrams for describing spectral spread of the anti-duplication control signal.

FIGS. 8A and 8B are diagrams for describing an example of spectral spread.

DETAILED DESCRIPTION OF THE PREFERRED EMBODIMENTS

One embodiment of the information signal transmission method, information signal duplication prevention control method, information signal output device, information signal recording device, and information signal recording medium in accordance with the present invention will be described in detail with reference to the drawings.

An information signal duplication prevention control system comprising an information signal output device and information signal recording device described hereinafter is an information signal duplication prevention control system to which the information signal transmission method and information signal duplication prevention control method in accordance with the present invention are applied. In the embodiment described hereinafter, a information signal output device and information signal recording device are described for the case that those devices are both applied to a DVD (digital video disk) recording/playing back device (referred to simply as DVD device hereinafter). For simplification, the description of audio signal system is omitted.

Figure 1:
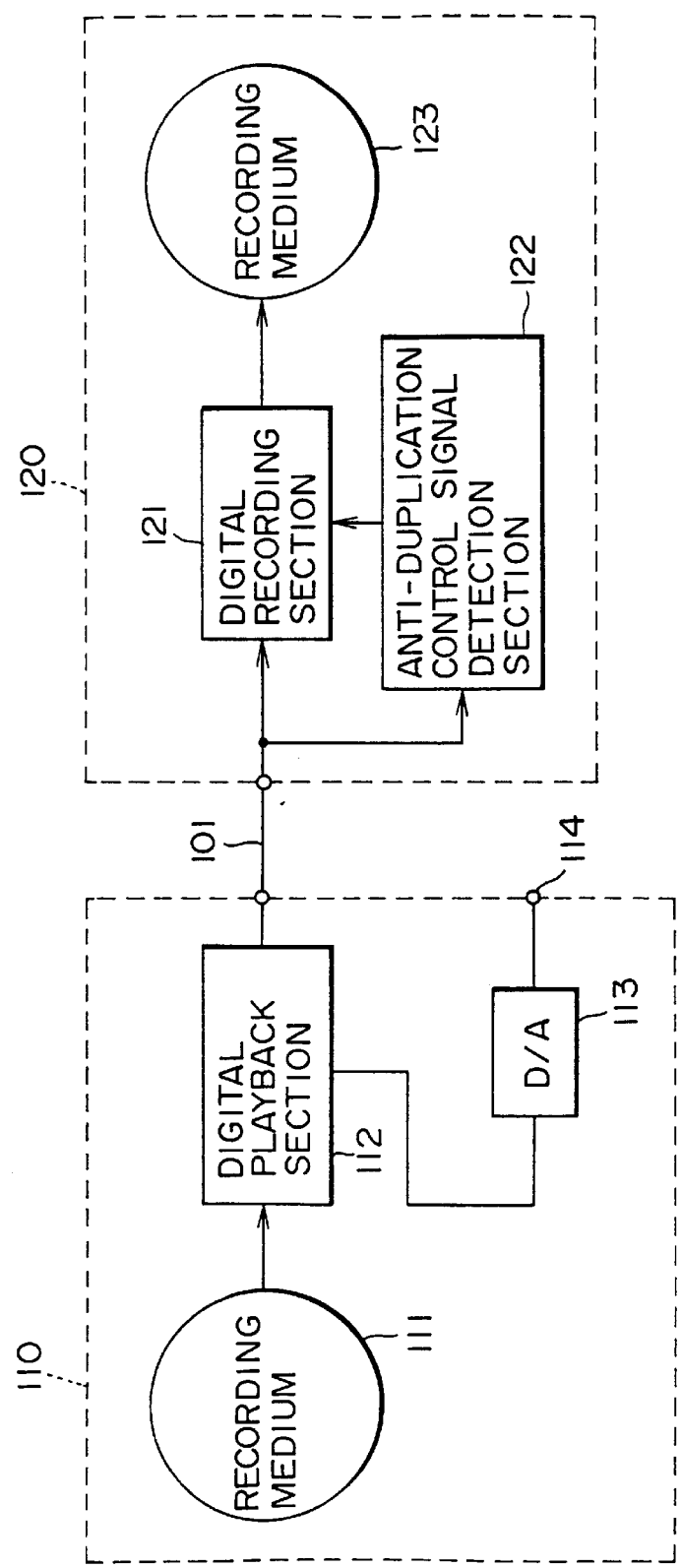
FIG. 1 is a block diagram for illustrating a conventional structure of a duplication prevention control system.
Figure 2:
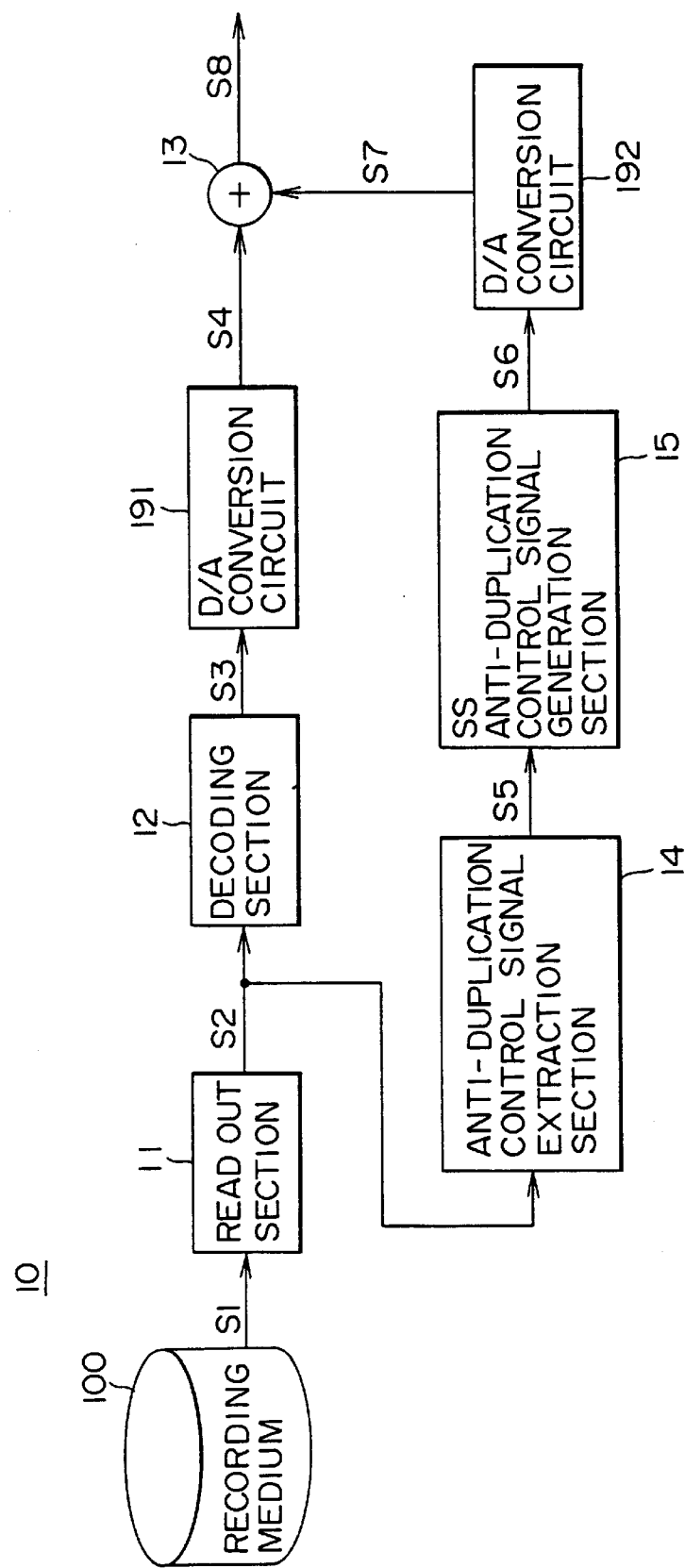
FIG. 2 is a block diagram for illustrating the one embodiment of a video signal output device used as the information signal output device in accordance with the present invention.

FIG. 2 is a block diagram for illustrating an information signal output device 10 (referred to simply as output device hereinafter) of the first embodiment. In other words, the output device 10 is corresponding to a playback system of a DVD device in the first embodiment.

In FIG. 2, on a recording medium 100, digitized images and audio signals are recorded together with an anti-duplication control signal as additional information. The recording medium 100 is a DVD in this embodiment. The anti-duplication control signal may be recorded on the innermost or outermost TOC (table of contents) or a track area known as the directory, or it may be inserted on a track in which image data or audio data is recorded, namely, on the same track but on the area different from the data recording area. An example described hereinafter is of the latter case, namely the case that the anti-duplication control signal is read out at the same time as the video signal is read out.

In this embodiment, the anti-duplication control signal is an information which indicates duplication inhibition or permission, or generation restriction of the video signal, and added on the video signal as 2 bit information.

In this first embodiment, the anti-duplication control signal of "00" indicates duplication inhibition, and the anti-duplication control signal of "11" indicates duplication permission. Further, the anti-duplication control signal of "01" indicates duplication permission of only one generation, and the anti-duplication control signal of "10" indicates duplication permission of two generations, namely the first generation and second generation.

Therefore, in the case of the anti-duplication control signal of "01", the video signal recorded on the first generation recording medium can be duplicated, but the video signal can not be duplicated using the second generation recording medium in which the video signal duplicated from the first generation recording medium is recorded.

Further, in the case of the anti-duplication control signal of "10", the video signal recorded in the first generation recording medium and second generation recording medium can be duplicated, but the video signal can not be duplicated using the third generation recording medium in which the video signal duplicated from the second generation recording medium is recorded by performing the second duplication using the recording medium in which the video signal is recorded.

As described herein above, in the first embodiment, four types of anti-duplication control signals, namely "00" for duplication inhibition, "11" for duplication permission, "01" for duplication permission of only one generation, and "10" for duplication permission of two generations of the first generation and second generation, are used.

The output device 10 superimposes one of a plurality of PN code strings different in series determined correspondingly to the anti-duplication control signal added on the video signal recorded on the recording medium 100 as a spectrally spread anti-duplication control signal.

In detail, the content of the anti-duplication control signal, namely the content of duplication prevention control of the video signal, is indicated by the difference in series of the PN code string, the PN code string different in series corresponds one-to-one to the respective control contents of the anti-duplication control signal.

As shown in FIG. 2, the output device 10 is provided with a read out section 11, decoding section 12, addition section 13, anti-duplication control signal extraction section 14, SS (SS stands for spectral spread hereinafter) anti-duplication control signal generation section 15, and D/A conversion circuits 191 and 192.

The read out section 11 extracts a digital playback video signal component S2 from a signal S1 obtained by playing back the information recorded in the disk 100, and supplies the extracted digital playback video signal component S2 to the decoding section 12 and the anti-duplication control signal extraction section 14.

The decoding section 12 generates a digital video signal S3 which contains the vertical sync signal and horizontal sync signal by performing decoding processing on the digital playback video signal component S2, and supplies the decoded signal to the D/A conversion circuit 191. The D/A conversion circuit 191 performs D/A conversion on the digital video signal S3, and generates an analog video signal S4. The analog video signal S4 generated therein is supplied to the addition section 13.

The anti-duplication control signal extraction section 14 extracts the anti-duplication control signal S5 from the information data string of the digital playback video signal component S2, and supplies it to the SS anti-duplication control signal generation section 15.

The SS anti-duplication control signal generation section 15 generates PN code strings different in series corresponding to the anti-duplication control signal S5 from the anti-duplication control signal extraction section 14, and outputs the anti-duplication control signal that is the spectrally spread PN code string (referred to as SS anti-duplication control signal hereinafter) S6.

The SS anti-duplication control signal generation section 15 outputs the PN code string of the first series in the case that the supplied anti-duplication control signal S5 is "00" for indicating duplication inhibition, alternatively outputs the PN code string of the second series in the case that the supplied anti-duplication control signal S5 is "01" for indicating duplication permission of the first generation, in such way, the SS anti-duplication control signal generation section 15 selects a PN code string of specified series corresponding to the control content which the anti-duplication control signal S5 indicates.

FIG. 3 is a block diagram for illustrating the SS anti-duplication control signal generation section 15. The anti-duplication control signal generation section 15 generates selectively one of a plurality of PN code strings different in series corresponding one-to-one to the control content of the duplication prevention control.

As shown in FIG. 3, the SS anti-duplication control signal generation section 15 is provided with a PN generation sections 501, 502, and 503, and selection section 504.

The PN generation sections 501, 502, and 503 generate PN code strings of respectively different series of PK1, PK2, and PK3. The PN generation section 501 generates the PN code string PK1 of the series corresponding to the anti-duplication control signal of "00" (duplication inhibition), the PN generation section 502 generates the PN code string PK2 of the series corresponding to the anti-duplication control signal "01" (duplication permission of the first generation). The PN generation section 503 generates the PN code string PK3 of the series corresponding to the anti-duplication control signal "10" (duplication permission of two generations). PN code strings PK1, PK2, or PK3 generated respectively from the PN generation sections 501, 502, and 503 are supplied to the selection section 504.

The selection section 504 selects a PN code string corresponding to the control content of the anti-duplication control signal S5 out of the PN code strings PK1, PK2, and PK3 having a plurality of different series, and outputs the selected PN code string S6.

In the case that the anti-duplication control signal S5 is "11" and indicates the information of free duplication, no PN code string is outputted, and the SS anti-duplication control signal is not superimposed on the video signal.

As the result, the PN code string different in series one-to-one corresponding respectively to the control content of the anti-duplication control signal is outputted from the SS anti-duplication control signal generation section 15 as the SS anti-duplication control signal S6, and supplied to the D/A conversion circuit 192.

The D/A conversion circuit 192 converts the SS anti-duplication control signal S6 to an analog SS anti-duplication control signal S7, and supplies it to the addition section 13.

Upon receiving supply of the analog video signal S4 and analog SS anti-duplication control signal S7, the addition section 13 generates an analog video signal S8 on which the analog SS anti-duplication control signal S7 is superimposed, and outputs the generated signal.

The analog video signal S8 on which the analog SS anti-duplication control signal S7 is superimposed is supplied to a monitor receiver for displaying a picture and a recording device for recording the video signal in the recording medium.

As described herein above, in the first embodiment, one of PN code strings different in series PK1, PK2, and PK3 corresponding to the control content which the anti-duplication control signal S5 indicates is outputted as the SS anti-duplication control signal and superimposed on the video signal.

Therefore, in the recording device, described hereinafter, which receives supply of the video signal outputted from the output device 10 of the first embodiment, the content of duplication prevention control is decided by detecting the series of the SS anti-duplication control signal S6 superimposed on the video signal.

By using the PN code string different in series, a plurality of SS anti-duplication control signals can be superimposed on the same time interval of the video signal. In this case, by detecting the PN code string using the PN code string different in series, a plurality of SS anti-duplication control signals superimposed on the same time interval of the video signal can be easily extracted respectively.

Accordingly, as described herein above, even in the case that the anti-duplication control signal indicates generation restriction wherein a plurality of PN code strings different in series is superimposed on the same time interval of the video signal supplied to the recording device side for duplication using a recording medium of the generation of and after second generation, the respective PN code strings are extracted, and the PN code string which indicates the strictest control content of duplication prevent control determined correspondingly to the series of the detected PN code string is decided to be the newest control content.

Next, the information recording device for receiving the output signal from the above-mentioned output device 10 and records the information is described.

Figure 4:
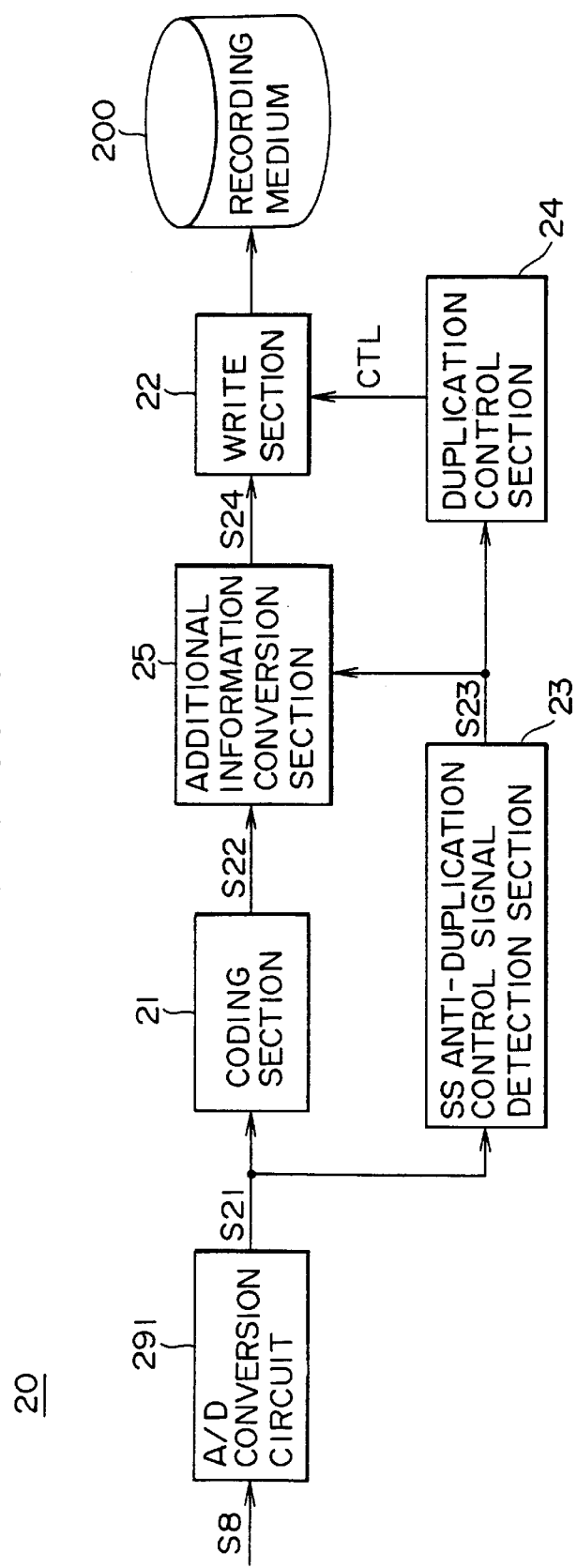
FIG. 4 is a block diagram for illustrating a video signal recording device used as the information signal recording device in accordance with the present invention.

FIG. 4 is a block diagram for illustrating the information recording device (referred to simply as recording device hereinafter) using in the information duplication prevention system of this embodiment. In other words, the recording device 20 corresponds to a recording system of a DVD device in the first embodiment.

The recording device 20 of the first embodiment is provided with a coding section 21, write section 22, SS anti-duplication control signal detection section 23, duplication permission/inhibition control section 24 (referred to as duplication control section hereinafter), addition information conversion section 25, and A/D conversion circuit 291 as shown in FIG. 4. A disk 200 is a DVD in which the video signal is to be written by the recording device 20.

To the recording device 20, as described herein above, the PN code string selected correspondingly to the anti-duplication control signal S5 is supplied as the analog video signal S8 on which the SS anti-duplication control signal is superimposed. The analog signal S8 is subjected to A/D conversion in the A/D conversion circuit 291, and the converted signal is supplied to the coding section 21 and SS anti-duplication control signal detection section 23 as the digital video signal S21.

Upon receiving supply of the digital video signal S21, the coding section 21 performs coding processing for removing the video sync signal and for data compression of the digital video signal to generate a recording digital video signal S22, and supplies it to the additional information conversion section 25.

The SS anti-duplication control signal detection section 23 detects the PN code string served as the SS anti-duplication control signal superimposed on the video signal supplied from the output device 10.

Figure 5:
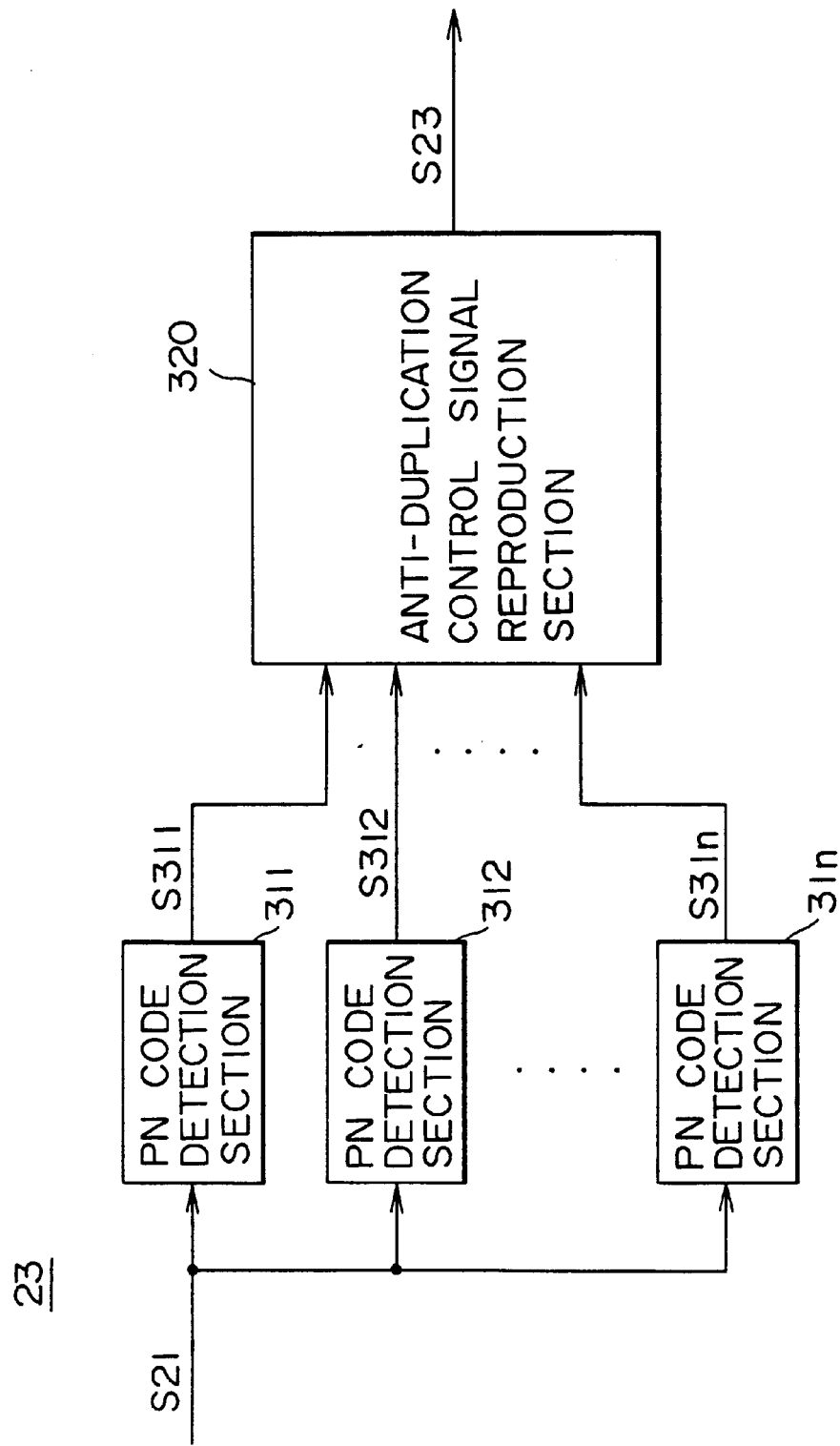
FIG. 5 is a block diagram for illustrating the SS anti-duplication control signal detection section of the video signal recording device shown in FIG. 4.

FIG. 5 is a block diagram for illustrating the SS anti-duplication control signal detection section 23. The SS anti-duplication control signal detection section 23 in this case corresponds to the case that the PN code string selected correspondingly to the anti-duplication control signal S5 out of a plurality of PN code strings different in series is used as the SS anti-duplication control signal in the above-mentioned output device 10.

As shown in FIG. 5, the SS anti-duplication control signal detection section 23 is provided with PN code detection sections 311, 312, . . . , 31$n$ and an anti-duplication control signal reproduction section 320.

To the PN code detection sections 311, 312, . . . , 31$n$, the video signal S21 on which the SS anti-duplication control signal is superimposed is inputted. The PN code detection sections detect respectively the PN code strings different in series. Detection results S311; S312, . . . , S31$n$ detected respectively by the PN code string detection sections 311, 312, . . . , 31$n$ are supplied to the anti-duplication control signal reproduction section 320.

The anti-duplication control signal reproduction section 320 judges the PN code string of which series is detected based on the detection results S311, S312, . . . , S31$n$, and specifies the content of duplication prevention control which the anti-duplication control signal indicates. Then, the anti-duplication control signal reproduction section 320 supplies the specified result to the additional information conversion section 25 as a signal S23.

In detail, the anti-duplication control signal reproduction section 320 generates and outputs the anti-duplication control signal S23 of "00" for the PN code string of the first series superimposed on the digital video signal S21, the anti-duplication control signal S23 of "01" for the PN code string of the second series, the anti-duplication control signal S23 of "10" for the PN code string of the third series.

Further, when the anti-duplication control signal reproduction section 23 detects a plurality of PN code strings different in series superimposed on the digital video signal S21, the anti-duplication control signal reproduction section 23 outputs the PN code which indicates the strictest control content out of respect control contents of duplication prevention control which the plurality of detected PN codes different in series indicates as the newest anti-duplication control signal.

If a PN doe string is not detected from the digital video signal S21, then the anti-duplication control signal reproduction section 32 generates and outputs an anti-duplication control signal S23 for converting to "11".

As described herein above, the anti-duplication control signal S23 outputted from the SS anti-duplication control signal detection section 23 is supplied to the duplication control section 24 and additional information conversion section 25.

The additional information conversion section 25 generates an anti-duplication control signal to be added in the data string of the digital video signal S22 to be recorded in the recording medium 200 based on the anti-duplication control signal S23 from the SS anti-duplication control signal detection section 23.

FIGS. 6A to 6C are diagrams for describing the processing performed by the additional information conversion section 25. The additional information conversion section 25 receives supply of the anti-duplication control signal S23 superimposed on the video signal S21 detected by the SS anti-duplication control signal detection section 23 as shown in FIG. 6A, and generates a new anti-duplication control signal S23N corresponding to the anti-duplication control signal S23.

The additional information conversion section 25 converts the anti-duplication control signal S23 to an anti-duplication control signal S23N as it is without changing the content of the anti-duplication control signal S23 if the anti-duplication control signal S23 is "00" for indicating duplication inhibition, and "11" for indicating duplication permission.

The additional information conversion section 25 generates a new anti-duplication control signal S23N of "00" if the anti-duplication control signal S23 is "01". In this case, this duplication is possible to be executed, but the video signal recorded in the recording medium this time is protected from duplication as described hereinbefore.

If the anti-duplication control signal S23 is "10", a new anti-duplication control signal S23N for converting to "01" is generated. In this case, this duplication (first duplication) is possible to be executed, and the duplication (second duplication) of the video signal recorded on the recording medium this time is also possible to be executed. However, the video signal recorded in the recording medium through the above-mentioned second duplication is protected from duplication.

As described herein above, in the case that the anti-duplication control signal S23 is an information which indicates generation restriction, the information generated by subtracting 1 from the generation restriction information which the SS anti-duplication control signal superimposed on the supplied video signal indicates is a new anti-duplication control signal S23N.

The newly generated anti-duplication control signal S23N is added on the data string of the video signal S22 as shown in FIG. 6C to result in generation of a video signal S24 to be recorded in the recording medium 200. The video signal S24 generated by updating the anti-duplication control signal by means of the additional information conversion section 25 is supplied to the write section 22.

On the other hand, the duplication control section 24 generates a control signal CTL for controlling the write section 22 based on the anti-duplication control signal S23, and supplies it to the write section 22. The control signal CTL controls writing of the video signal S24 whether to be permitted or inhibited in the disk 200.

The write section 22 writes the digital video signal S24 in the disk 200 if the control signal CTL from the duplication control section 24 is a signal for permitting duplication, and on the other hand, does not write the digital video signal S24 in the disk 200 if the control signal CTL from the duplication control section 24 is a signal for inhibiting duplication.

As described herein above, upon receiving supply of the video signal having the PN code string superimposed thereon of the series determined correspondingly to the anti-duplication control signal S5 in the output device 10, the recording device 20 detects the PN code string having the series of the PN code string on which the video signal is superimposed, thereby the recording device 20 of the first embodiment can judge the content of the duplication prevention control.

In the first embodiment, the PN code string having the series determined correspondingly to the anti-duplication control signal S5 is superimposed as the SS anti-duplication control signal instead the above-mentioned anti-duplication control signal S5 itself is spectrally spread using the PN code string and it is superimposed on the video signal.

The PN code string is a code for spreading a narrow band anti-duplication control signal to a wide band signal, and is originally a wide band signal. Therefore as described herein above, the PN code strings one-to-one corresponding to the respective control contents of the duplication prevention control have the same characteristics and the same function as the SS anti-duplication control signal which is generated by spreading an anti-duplication control signal using the PN code string.

FIGS. 7A to 7C, FIGS. 8A and 8B, and FIGS. 9A to 9D are diagrams for describing examples in which the anti-duplication control signal added on the video signal is extracted and the anti-duplication control signal itself is spectrally spread as described herein above.

As shown in FIGS. 7A to 7C, in the case that the anti-duplication control signal extracted in the data string of the video signal is spectrally spread, the anti-duplication control signal S5 added as an additional information (FIG. 7B) is extracted from the information data string of the digital played back video signal component S2 (FIG. 7A), the extracted anti-duplication control signal S5 (FIG. 7B) is multiplied by a previously determined PN code string PS (FIG. 7C) to generate the SS anti-duplication control signal S6.

In this case of spectral spread, as shown in FIG. 8A, N (N is an integer of one or larger) bit anti-duplication control signal S5 added as an additional information is spectrally spread using one series of PN code string, or as shown in FIG. 8B, each bit of the N bit anti-duplication control signal is spectrally spread using one series of PN code string. Thereby, a narrow band high level anti-duplication control signal S5 is converted to a wide band low level SS anti-duplication control signal.

Figure 9A:
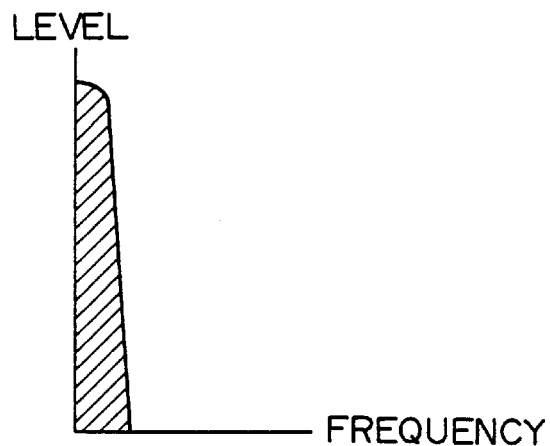
FIGS. 9A and 9D are diagrams for describing the relation between the SS anti-duplication control signal and information signal in the form of spectrum.
Figure 9B:
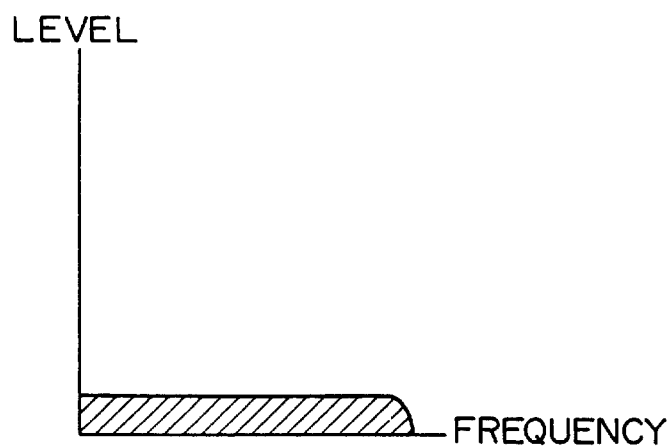

In detail, an anti-duplication control signal extracted from the video signals a low bit rate signal containing a small information before spectral spread, and is a narrow band signal as shown in FIG. 9A. Upon being subjected to spectral spread, this narrow band signal is converted to a wide band signal as shown in FIG. 9B. When, the spectrally spread signal level is reduced in inverse proportion to the enlargement ratio of the band width.

Such spectrally spread signal namely SS anti-duplication control signal S6 is superimposed on an information signal, when as shown in FIG. 9C, the SS anti-duplication control signal S6 is superimposed at a level smaller than the dynamic range of the video signal that is served as an information signal. By superimposing the SS anti-duplication control signal in such way, the SS anti-duplication control signal is superimposed without deterioration of the main information signal. Therefore, when the video signal on which the SS anti-duplication control signal is superimposed is supplied to a monitor receiver and a picture is displayed, a good played back picture is obtained without adverse effect of the SS anti-duplication control signal.

Further, when spectral inversion spread is performed to detect the SS anti-duplication control signal in the recording side, the SS anti-duplication control signal is restored again as a narrow band signal as shown in FIG. 9D. By giving a sufficiently large band spread ratio, the power of the anti-duplication control signal after inversion spread exceeds that of the information signal, and is detected easily.

In this case, the SS anti-duplication control signal superimposed on the analog video signal is superimposed on the same time interval and the same frequency, and consequently it is impossible to remove or change the SS anti-duplication control signal only by replacement of frequency filter or simple information.

Therefore, the SS anti-duplication control signal superimposed on the video signal can not be removed, and the SS anti-duplication control signal is supplied consistently to devices such as a monitor receiver and recording device.

In the first embodiment, as described herein above, in the case that the PN code string itself is superimposed on the video signal as the SS anti-duplication control signal, also the video signal is not deteriorated and detection is possible as in the case that the spectrally spread anti-duplication control signal is superimposed on the video signal.

By judging the type of PN code with aid of the PN code one-to-one corresponding to the respective content of the duplication prevention control, the control content of the duplication prevention control which the anti-duplication control signal extracted from the video signal indicates is transmitted correctly, and in the recording device 20, the control content of the duplication prevention control can be decided correctly.

The PN code string one-to-one corresponding to the duplication prevention control can be used as the SS anti-duplication control signal generated by spectrally spreading the anti-duplication control signal S5 using the PN code string, and used as a spectrally spread additional information.

Further, as described using FIGS. 7A to 7C and FIGS. 8A and 8B, in the case that the SS anti-duplication control signal generated by spectrally spread the anti-duplication control signal extracted from the video signal using the PN code string is superimposed on the video signal, if a plurality of SS anti-duplication control signals is superimposed on the same time interval of the video signal, it is difficult to detect the newest SS anti-duplication control signal because the PN code which spectrally spreads the anti-duplication control signal is the same.

For example, in the case that the anti-duplication control signal recorded in the recording medium 100 is the information which permits duplication of two generations, in the first duplication, the SS anti-duplication control signal corresponding to the two bit anti-duplication control signal of "10" is superimposed on the video signal to be recorded in the recording medium 200 as described herein above.

To duplicate the second generation, the recording medium 200 is placed in the output device 50, and the second duplication is operated, when, the SS anti-duplication control signal corresponding to the anti-duplication control signal of "01" is superimposed additionally on the video signal on which the SS anti-duplication control signal corresponding to the anti-duplication control signal of "10" is already superimposed is superimposed on the video signal recorded in another recording medium.

As described herein above, in the case of the anti-duplication control signal of generation restriction of a plurality of generations, when the second generation recording medium or third generation recording medium is used as an original for next duplication, the video signal to be duplicated contains a plurality of SS anti-duplication control signals superimposed every duplication repeatedly accumulated up to prior duplication, and a plurality of different SS anti-duplication control signals is superimposed on the same time interval of the video signal.

In this case, for example as described herein above, in the recording device 20, it is possible to cancel the old anti-duplication control signal by way of applying a method in which the same SS anti-duplication control signal as the old SS anti-duplication control signal superimposed previously on the video signal is generated and the old SS anti-duplication control signal is subtracted from the video signal. However, it takes some work to cancel the old anti-duplication control signal as described herein above, and it is unfavorable also because some circuits are required for it.

However, in such case, the newest SS anti-duplication control signal is detected out of a plurality of SS anti-duplication control signals having different series superimposed on the video signal and duplication prevention control corresponding to the detected newest SS anti-duplication control signal can be performed by applying a method that all the SS anti-duplication control signals superimposed on the digital video signal S21 is detected in the SS anti-duplication control signal detection section S23 of the recording device 20 and then the SS anti-duplication control signal having the strictest condition for duplication prevention control is detected as the newest anti-duplication control signal.

For example, in the case that the digital video signal S21 supplied to the SS anti-duplication control signal detection section S23 contains superimposed three PN code strings of the PN code string PK1 having the first series, the PN code string PK2 having the second series, and the PN code string PK3 having the third series, the PN code string PK1 having the first series is regarded as the newest PN code string, and the signal is decided to be "00" anti-duplication control signal, namely, duplication inhibition.

As described herein above, also in the case that a plurality of PN code strings having different series is superimposed on the same time interval of the video signal, the newest anti-duplication control signal is extracted and duplication prevention control corresponding to the newest anti-duplication control signal can be performed rapidly and correctly.

In this case, it is not required that detection processing of a plurality of PN code strings is performed a plurality of times correspondingly to a plurality of superimposed PN code strings having different series, and as described herein above using FIG. 5, in the first embodiment, a plurality of PN code strings having different series can be detected at a time in the SS anti-duplication control signal detection section 23 of the recording device 20.

Further in the additional information conversion section 25 of the recording device 20, a new anti-duplication control signal S23N is generated based on the SS anti-duplication control signal superimposed on the video signal, and the digital video signal S24 on which the newly generated anti-duplication control signal S23N is superimposed is recorded in the recording medium 200.

Therefore, in the event that the anti-duplication control signal superimposed on the video signal recorded in the recording medium 100 is removed between the output device 10 and recording device 20, or that the anti-duplication control signal added on the data of the digital video signal is removed due to conversion of the digital video signal recorded in the recording medium 200 to an analog signal, the digital video signal S24 having the new anti-duplication control signal added thereon corresponding to the spectrally spread SS anti-duplication control signal superimposed on the video signal can be recorded in the recording medium 200.

Thereby, the anti-duplication control signal superimposed on the video signal will not be canceled. Further, in the case that the SS anti-duplication control signal is an information which indicates generation restriction, the additional information conversion section 25 generates a new anti-duplication control signal corresponding to the SS anti-duplication control signal as described herein above, generates a digital video signal S24 on which the new anti-duplication control signal is superimposed, and the generated digital video signal S24 is recorded in the recording medium 200. In other words, the video signal on which the updated new anti-duplication control signal is superimposed is recorded in the recording medium 200.

In the case that there remains an old residual anti-duplication control signal in the digital video signal S22 to be recorded in the recording medium 200, the additional information conversion section 25 adds a newly generated anti-duplication control signal on the video signal. Therefore, even in the case that the anti-duplication control signal is an information which indicates generation restriction, the duplication prevention control corresponding to the anti-duplication control signal superimposed on the duplicated video signal recorded in the recording medium 200 is performed correctly.

In the output device 10 of the above-mentioned first embodiment as described in FIG. 2, by providing the D/A conversion circuits 191 and 192 in the front end of the addition section 13, the analog SS anti-duplication control signal S7 is superimposed on the analog video signal S4, however, the present invention is by no means limited to the case.

Figure 10:
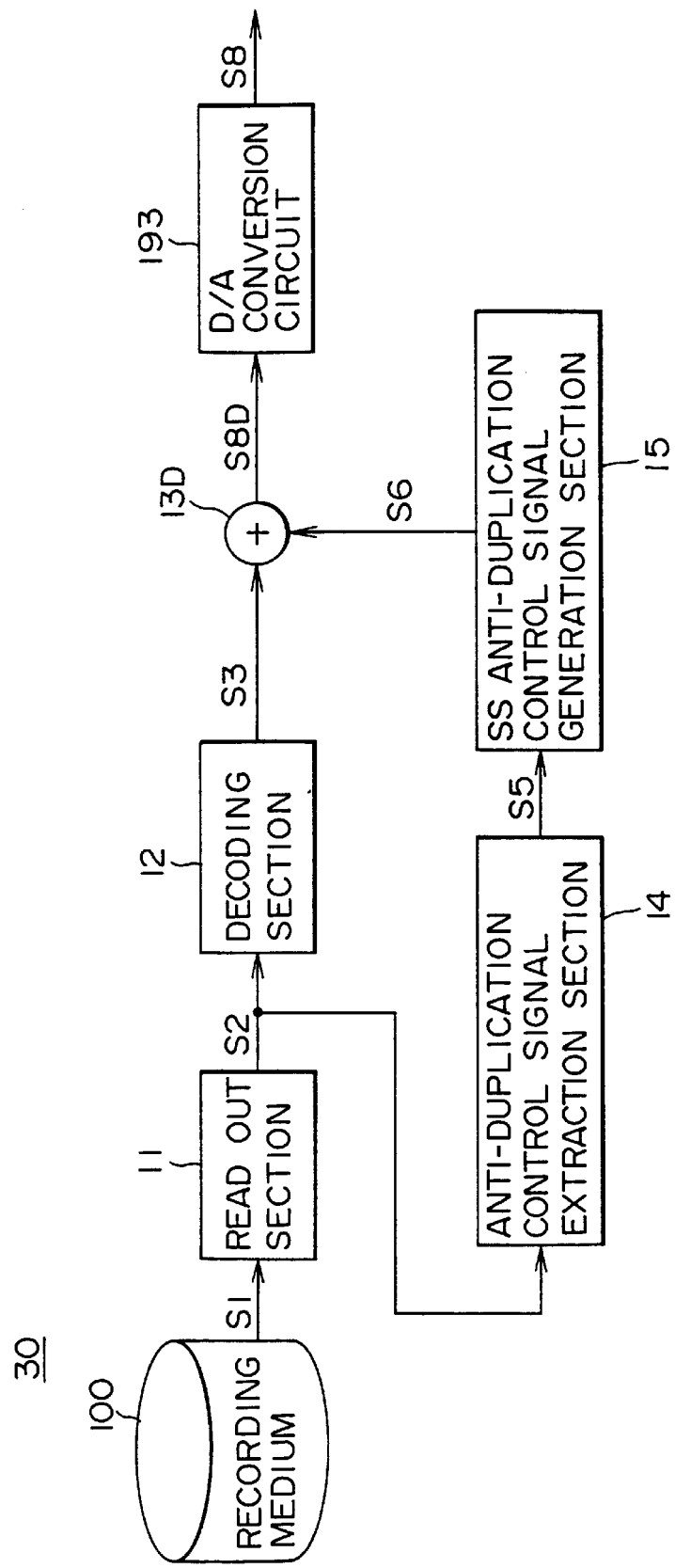
FIG. 10 is a block diagram for illustrating another example of a video signal output device used as the information signal output device in accordance with the present invention.
Figure 11:
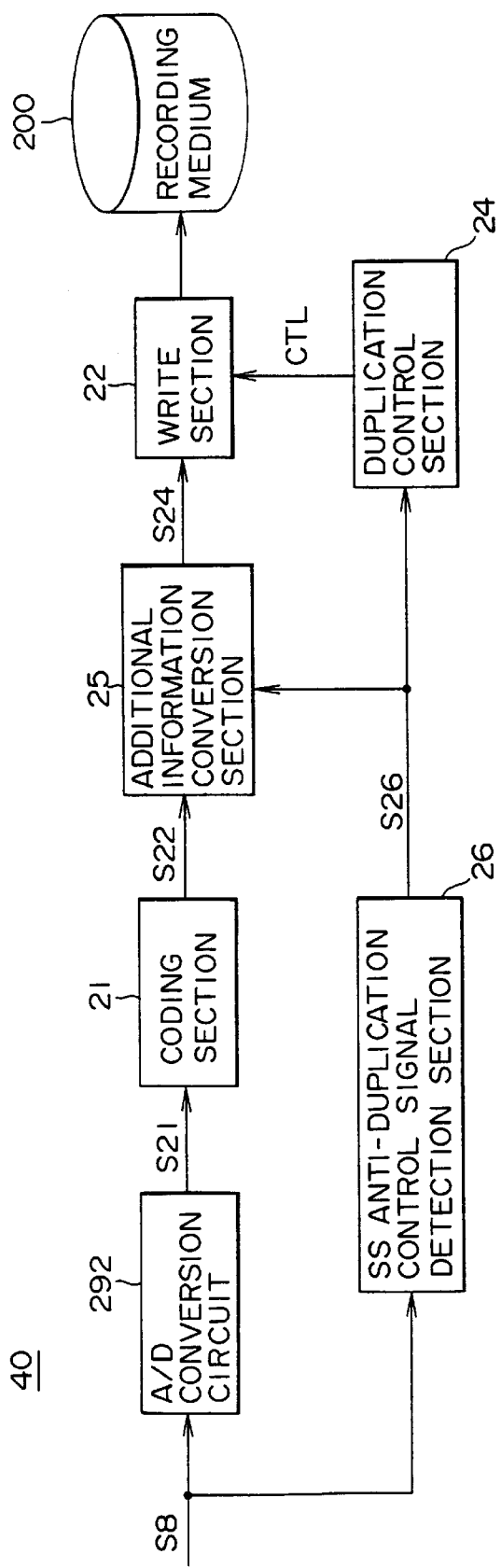
FIG. 11 is a block diagram for illustrating another example of a video signal recording device used as the information signal recording device in accordance with the present invention.

For example, an output device 30 to which a D/A conversion circuit 193 is provided in the rear end of the digital addition section 13D as shown in FIG. 10 may be used. In this case, the digital addition section 13D adds the digital SS anti-duplication control signal S6 to the digital video signal S3 to generate a digital video signal S8D as shown in FIG. 10. The digital video signal S8D is supplied to the D/A conversion circuit 193, and subjected to D/A conversion to generate an analog video signal S8.

As described herein above, D/A conversion may be performed after superimposition processing in the digital addition section 13D. In this case, only one D/A conversion circuit is sufficient for function.

In the recording device 20 of the above-mentioned first embodiment, the A/D converted digital video signal S21 is supplied to the SS anti-duplication control signal detection section 23, however, the present invention is by no means limited to the case.

For example, a recording device 40 in which the analog video signal before A/D conversion is supplied to the SS anti-duplication control signal detection section 26 may be used.

In this case, the analog video signal S8 supplied from the output device 10 or output device 30 is supplied to the A/D conversion circuit 292 and SS anti-duplication control signal detection section 26. The SS anti-duplication control signal detection section 26 detects the SS anti-duplication control signal superimposed on the analog video signal S8.

In other words, the SS anti-duplication control signal detection section 26 functions to detect the PN code string spectrally spread and superimposed on the supplied signal, like the SS anti-duplication control signal detection section 23 of the above-mentioned recording device 20.

The anti-duplication control signal S26 detected by the SS anti-duplication control signal detection section 26 is supplied to a duplication control section 24 and additional information conversion section 25. The anti-duplication control signal S26 detected by the SS anti-duplication control signal detection section 26 is the same signal as the anti-duplication control signal S23 detected by the SS anti-duplication control signal detection section 23 in the above-mentioned recording device 20.

The additional information conversion section 25 generates a new anti-duplication control signal based on the anti-duplication control signal S26 as described herein above, and the video signal S24 on which the new anti-duplication control signal is superimposed is generated. The video signal S24 is recorded in the recording medium 200.

The duplication control section 24 generates a control signal CTL for controlling the write section 22 as described herein above and supplies it to the write section 22.

As described herein above, by using the SS anti-duplication control signal detection section 26 which is capable of detecting the anti-duplication control signal superimposed on the analog video signal S8, the anti-duplication control signal is extracted from the analog video signal S8 instead of the digital video signal S21, and duplication prevention control can be performed correspondingly.

Next, the second embodiment of an information signal output device and information signal recording device in accordance with the present invention will be described hereinafter.

In the second embodiment, the output device generates a plurality of spread codes different in type by combining one type of a PN code string and one of a plurality of orthogonal codes one-to-one corresponding to the respective control content of the duplication prevention control correspondingly to the anti-duplication control signal, and superimposes this spread code on the video signal as the SS anti-duplication control signal S6.

By transmitting the video signal having the spread code superimposed thereon generated using the orthogonal codes of different types dependently on the anti-duplication control signal S5 extracted from the video signal, the control content of the duplication prevention control is transmitted to the recording device side.

The recording device side judges the control content of the duplication prevention control based on the type of the orthogonal code used for generation of the spread code superimposed on the video signal.

In the second embodiment, the output device and recording device have the same structure as the output device 10 and recording device 20 shown in FIG. 2 and FIG. 4 respectively. However, an SS anti-duplication control signal generation section 15 in the output device 10 and SS anti-duplication control signal detection section 23 in the recording device 20 are different from those in the output device and recording device of the second embodiment.

Therefore, only the SS anti-duplication control signal generation section 15 in the output device and the SS anti-duplication control signal detection section 23 in the recording device which are different from those of the first embodiment are described herein, and description of the residual same components as those in the output device 10 and recording device 20 of the first embodiment is omitted.

Figure 12:
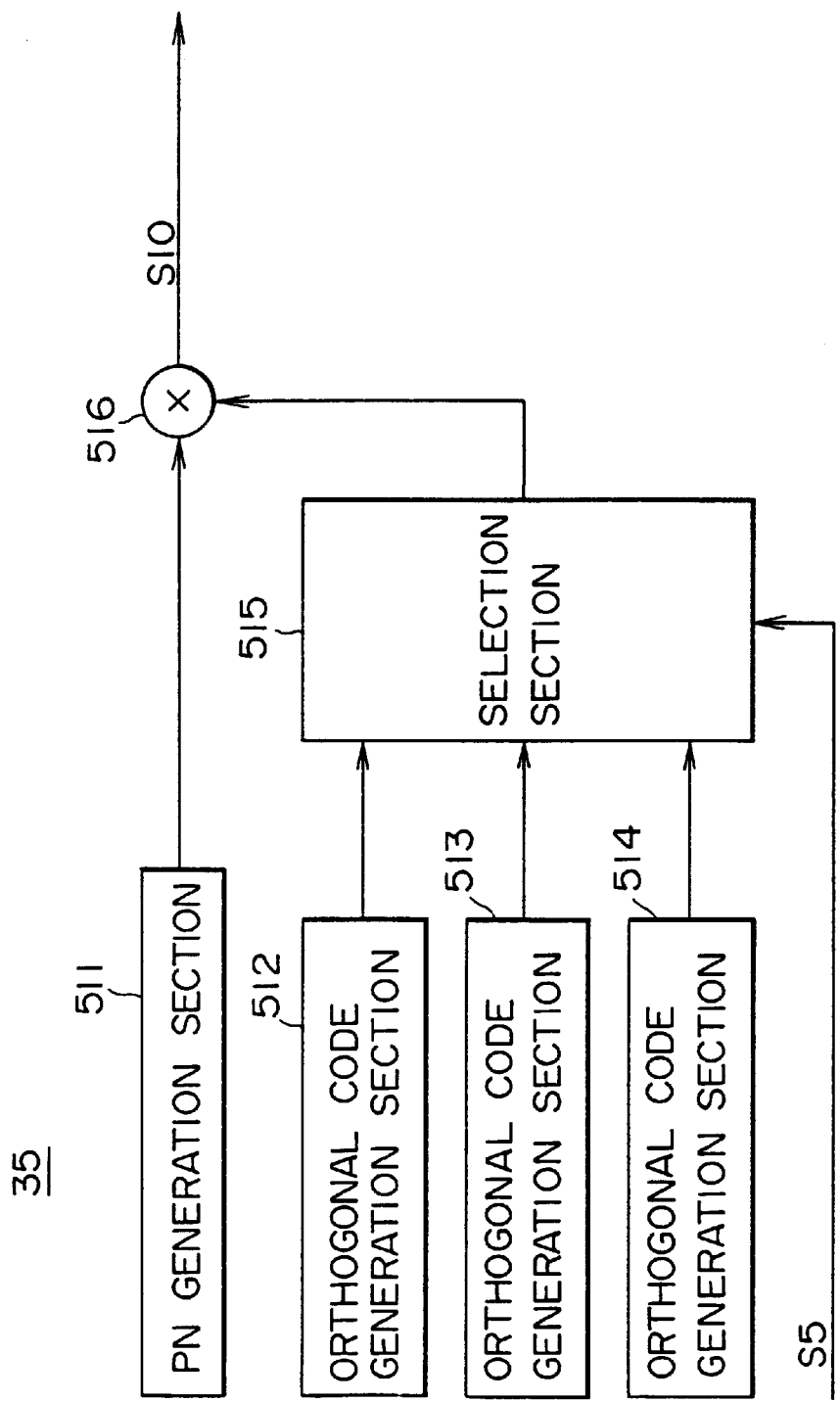
FIG. 12 is a block diagram for illustrating another example of an SS anti-duplication control signal generation section of the video signal output device shown in FIG. 2.

FIG. 12 is a block diagram for illustrating the SS anti-duplication control signal generation section 15 in the output device of the second embodiment. As shown in FIG. 12, the SS anti-duplication control signal generation section 15 in the output device of the second embodiment is provided with a PN generation section 511, orthogonal code generation sections 512, 513, and 514, selection section 515, and addition section 516.

The PN generation section 511 generates a PN code string, and supplies it to the addition section 516. The orthogonal code generation sections 512, 513, and 514 generates different orthogonal code strings, and supplies them to the selection section 515.

The selection section 515 supplies an orthogonal code selected correspondingly to the control content of the anti-duplication control signal S5 out of a plurality of different orthogonal codes to the addition section 516. The addition section 516 multiplies the PN code string by the selected orthogonal code and outputs the resultant signal as the SS anti-duplication control signal S6.

Thereby, the spread code generated using one type of PN code string and a plurality of orthogonal strings which are one-to-one corresponding to the respective control content of the duplication prevention control dependently on the anti-duplication control signal S5 is outputted from the SS anti-duplication control signal generation section 15 as the SS anti-duplication control signal S6 and superimposed on the video signal.

Though the SS anti-duplication control signal detection section 23 in the recording device side corresponding to the SS anti-duplication control signal generation section shown in FIG. 12 has the same structure as the SS anti-duplication control signal detection section 23 described hereinbefore using FIG. 5, processing in the PN code detection sections 311, 312, ... , 31n is different. Therefore, the SS anti-duplication control signal detection section 23 of the second embodiment is described on the assumption that the SS anti-duplication control signal section 23 has the same structure as shown in FIG. 5.

In the recording device of the second embodiment, the PN code detection sections 311, 312, ... , 31n of the SS anti-duplication control signal detection section 23 in the recording device detect respectively the spread code different in type generated by multiplying the PN code string generated in the PN code generation section 511 shown in FIG. 12 by an orthogonal code generated respectively from the orthogonal code generation sections 512, 513, and 514.

For example, the PN code detection section 311 of the SS anti-duplication control signal detection section 23 shown in FIG. 5 detects the spread code generated using the orthogonal code generated from the orthogonal code generation section 512, and the PN code detection section 312 detects the spread code generated using the orthogonal code generated from the orthogonal code generation section 513. Similarly, the PN code detection section 313 detects the spread code generated using the orthogonal code generated from the orthogonal code generation section 514.

From the PN code detection sections 311, 312, ... , 31n which detect the spread code superimposed on the video signal S21, a signal which indicates that the spread code is detected is outputted, and the signal is supplied to the anti-duplication control signal reproduction section 320.

The anti-duplication control signal reproduction section 320 judges that which orthogonal code is detected in the detected spread code, depending on the type of spread code detected, namely in the second embodiment, the type of orthogonal code used for generation of the spread code, and resultantly the control content of the duplication prevention control is decided, and the anti-duplication control signal S23 corresponding to the decided control content is outputted.

As described herein above, it is decided that which orthogonal code is used out of the plurality of orthogonal codes different in type for generating the spread code that is the product of the PN code generated from the PN code generation section 511 and one orthogonal code, and the content of duplication prevention control is decided with reference to the type of the orthogonal code.

As described herein above, in the case that the spread code generated by combining one type of the PN code string and one of the plurality of orthogonal codes different in type one-to-one correspondingly to the respective control contents of the duplication prevention control which the anti-duplication control signal added in the video signal data string recorded in the recording medium 100 indicates, the control content of the duplication prevention control is transmitted, and in the recording side, the content of the duplication prevention control is decided dependently on the orthogonal code used for generating the PN code string superimposed on the video signal, and the duplication prevention control corresponding to the anti-duplication control signal extracted from the video signal data string is performed.

In the second embodiment, if the spread codes generated by using one type of the PN code and a plurality of types of orthogonal codes is superimposed on the same time interval of the video signal, the respective spread codes can be detected.

In detail, all the SS anti-duplication control signals superimposed on the digital video signal S21 are detected and the SS anti-duplication control signal of the strictest condition on the duplication prevention control is detected out of the detected SS anti-duplication control signals as the newest SS anti-duplication control signal, thereby, the newest SS anti-duplication control signal is detected out of the plurality of SS anti-duplication control signals superimposed on the video signal and the duplication prevention control corresponding to the detected newest SS anti-duplication control signal is performed.

Further in this case, it is not required that the spread code is detected repeatedly a plurality of times correspondingly to the plurality of spread codes different in type superimposed on the video signal, in the same way as in the above-mentioned first embodiment, the plurality of spread codes can be detected simultaneously in the SS anti-duplication control signal detection section 23 of the second embodiment.

As described herein above, in the second embodiment, the same effect as obtained in the case that a plurality of PN code strings different in series of the above-mentioned first embodiment is used is obtained.

Figure 13:
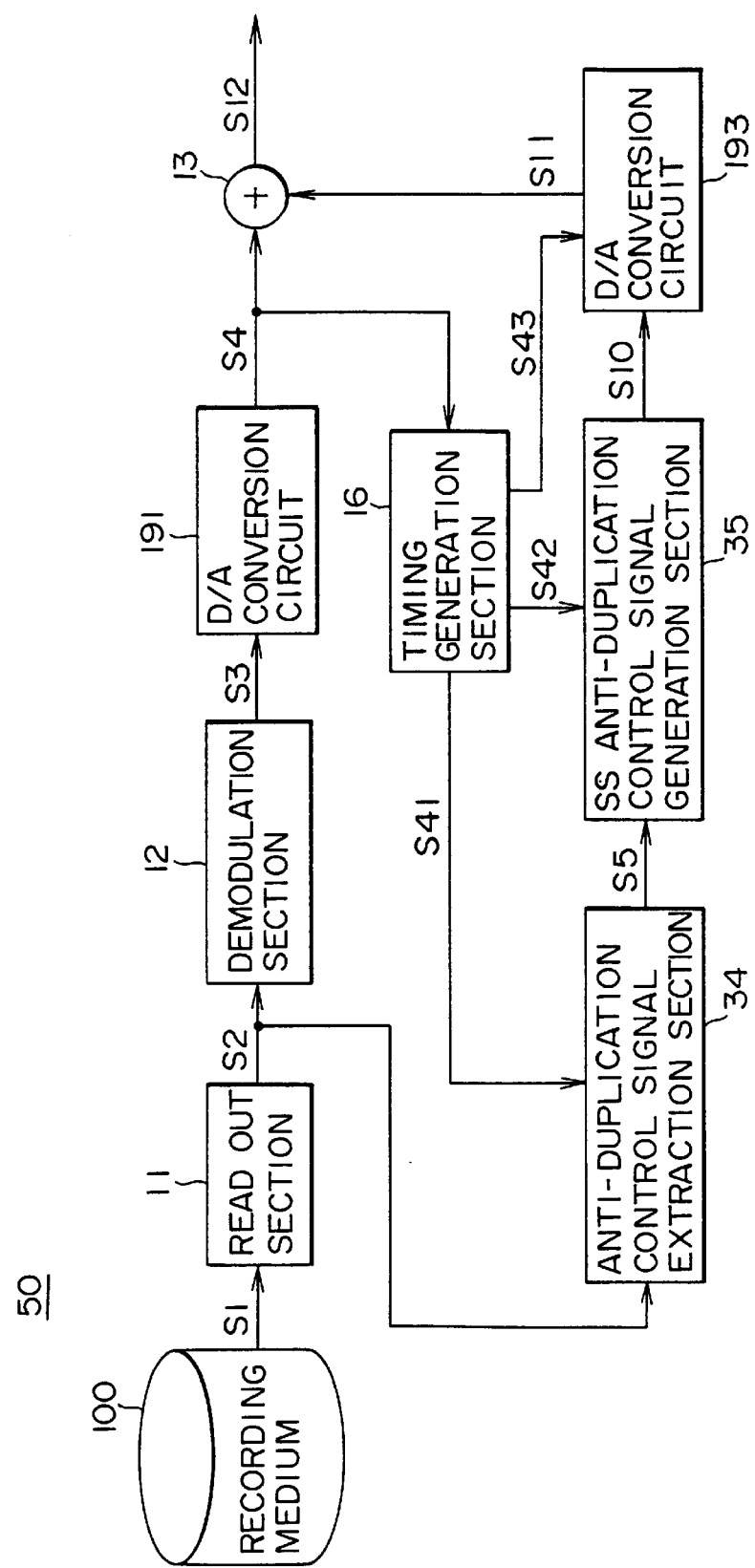
FIG. 13 is a block diagram for illustrating another example of a video signal output device used as the information signal output device in accordance with the present invention.

FIG. 13 is a block diagram for illustrating the third embodiment of an information signal output device in accordance with the present invention.

An output device 50 of the third embodiment generates PN code strings different in phase with respect to a reference phase corresponding to the anti-duplication control signal 5 extracted from the video signal, outputs the generated PN code strings as the SS anti-duplication control signal S6, and superimposes on the video signal. In this embodiment, the reference phase is determined correspondingly to the video sync signal in the video signal as described hereinafter.

In the third embodiment, by determining the phase of the PN code string, namely the start timing of the PN code string, based on the video sync signal, the PN code string different in phase with respect to the reference phase is generated consistently and correctly.

As shown in FIG. 13, the output device 50 of the third embodiment is provided with a read out section 11, decoding section 12, addition section 13, anti-duplication control signal extraction section 34, SS anti-duplication control signal generation section 35, and D/A conversion circuits 191 and 193, and a timing generation section 16 for generating a timing signal used for spectral spread and clock signal.

The anti-duplication control signal extraction section 34 and D/A conversion circuit 193 have the same function as the anti-duplication control signal extraction section 14 and D/A conversion circuit 192 in the output device 10 of the above-mentioned first embodiment, however, those are partially different in that those components receive supply of the timing signal from the timing generation section 16.

Further, the anti-duplication control signal generation section 35 generates the PN code strings different in phase with respect to the reference phase one-to-one corresponding to the respective control contents of the duplication prevention control correspondingly to the control content which the anti-duplication control signal S5 outputted from the anti-duplication control signal extraction section 34 indicates, and outputs it as the SS anti-duplication control signal S6.

The read out section 11, decoding section 12, addition section 13, D/A conversion circuit 191, and disk 100 are the same components as the corresponding components in the output device 10 of the above-mentioned first embodiment. Therefore, in the third embodiment also, when the video data is read out from the recording medium 100, the anti-duplication control signal is read out simultaneously.

The anti-duplication control signal is the information which indicates duplication inhibition or permission of the video signal, or indicates generation restriction like the above-mentioned first embodiment, and the anti-duplication control signal is added in the video signal as a 2 bit information.

The output device 50 of the third embodiment generates the timing signal used for spectral spreading the anti-duplication control signal and the clock signal based on the video signal played back from the disk 100 by means of the timing generation section 16.

Upon receiving supply of an analog video signal S4 containing a video sync signal generated through the read out section 11, coding section 12, and D/A conversion circuit 191, the timing generation section 16 generates various timing signals S41 to S43 and clock signal CLK which are to be supplied to the anti-duplication control signal extraction section 34, SS anti-duplication control signal generation section 35, and D/A conversion circuit 193. The various timing signals S41 to S43 generated by the timing generation section 16 are supplied to the respective components as shown in FIG. 13.

Figure 14:
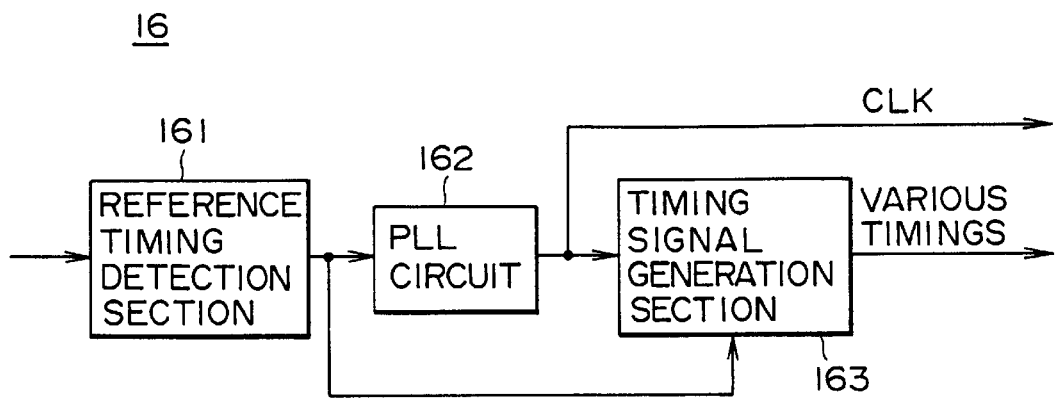
FIG. 14 is a block diagram for illustrating a timing generation section of the video signal output device shown in FIG. 13.

FIG. 14 is a block diagram for illustrating the timing generation section 16. As shown in FIG. 14, the timing generation section 16 is provided with a reference timing detection section 161, PLL circuit 162, and timing signal generation section 163.

The reference timing detection section 161 extracts the video sync signal which is served as the reference timing signal from the input analog video signal S4. In this embodiment, the vertical sync signal is used as the reference timing signal. The reference timing detection section 161 extracts the vertical sync signal, and supplies it to the PLL circuit 162 and timing signal generation section 163.

The PLL circuit 162 generates a clock signal CLK synchronous with the vertical sync signal, and supplies it to the timing signal generation section 163 and other components for processing.

The timing signal generation section 163 generates timing signals S41 to S43 based on the vertical sync signal and clock signal CLK and outputs them. The timing signals S41 to S43 controls the operation of the anti-duplication control signal extraction section 34, SS anti-duplication control signal generation section 35, and D/A conversion circuit 193.

As described herein above, the output device 50 of the third embodiment generates the clock signal CLK and various timing signals S41 to S43 using the vertical sync signal contained in the analog video signal as the reference signal and outputs them.

The anti-duplication control signal extraction section 34 extracts the anti-duplication control signal S5 from the data string of the played back video signal component S2 extracted by the read out section 11 based on the timing signal S41 from the timing signal generation section 16, and supplies it to the SS anti-duplication control signal generation section 35.

If the supplied anti-duplication control signal S5 is "00" for indicating duplication inhibition, the SS anti-duplication control signal generation section 35 outputs the PN code string having the first phase (phase of 0), if the anti-duplication control signal S5 is "01" for indicating duplication permission of the first generation, the SS anti-duplication control signal generation section 35 outputs the PN code string having the second phase (phase of 1), like those examples, the anti-duplication control signal generation section 35 outputs the PN code string having a different phase corresponding to the control content which the anti-duplication control signal S5 indicates.

Figure 15:
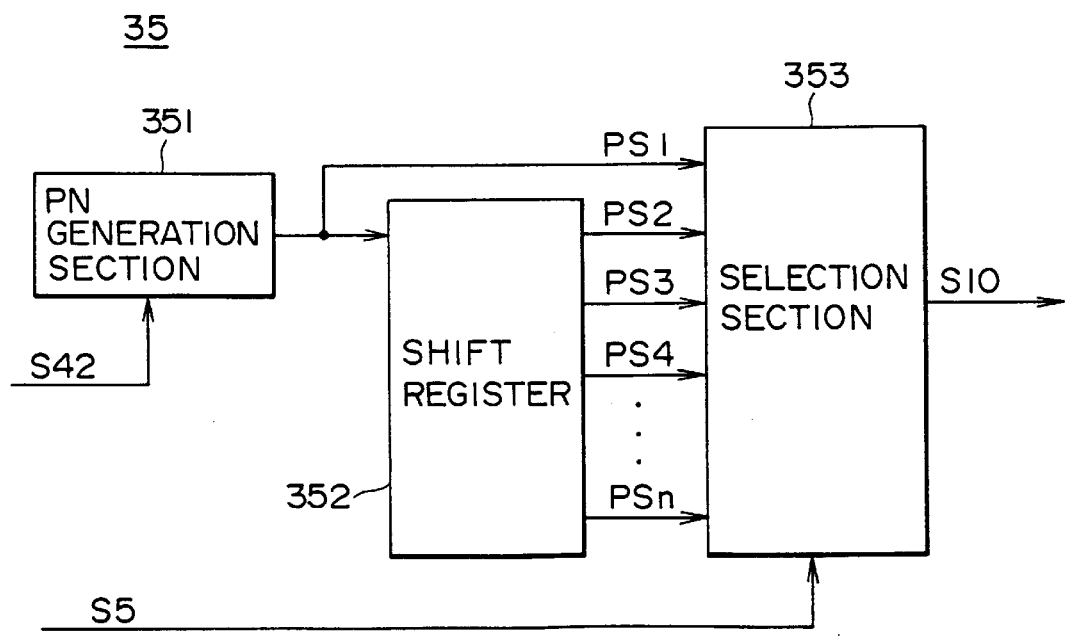
FIG. 15 is a block diagram for illustrating an SS anti-duplication control signal generation section of the video signal output device shown in FIG. 13.

FIG. 15 is a block diagram for illustrating the SS anti-duplication control signal generation section 35 of the third embodiment. The SS anti-duplication control signal generation section 35 is provided with a PN code generation section 351, shift register 352, and selection section 353, and outputs one of PN code strings different in phase PS1, PS2, . . . , PSn corresponding to the control content of the anti-duplication control signal S5 outputted from the anti-duplication control signal extraction section 34 as the SS anti-duplication control signal S6.

The PN code generation section 251 generates a PN code string PS1 based on the timing signal S42 from the timing generation section 16 and clock signal CLK. The generated PN code string PS1 is supplied to the shift register 352 and selection section 353. The timing signal S42 is a signal for generating a PN code string having a pre-determined code pattern from the head thereof.

The timing signal S42 is generated with reference to the front end of a vertical sync signal in the third embodiment, and is a signal synchronous with the vertical sync signal, the PN code string is generated every one vertical interval. In detail, based on the timing signal S42, the PN code string PS1 generated first is the PN code string having phase of 0 having no phase deviation with respect to the reference phase. The clock signal CLK is also the signal synchronous with the vertical sync signal.

Figure 16:
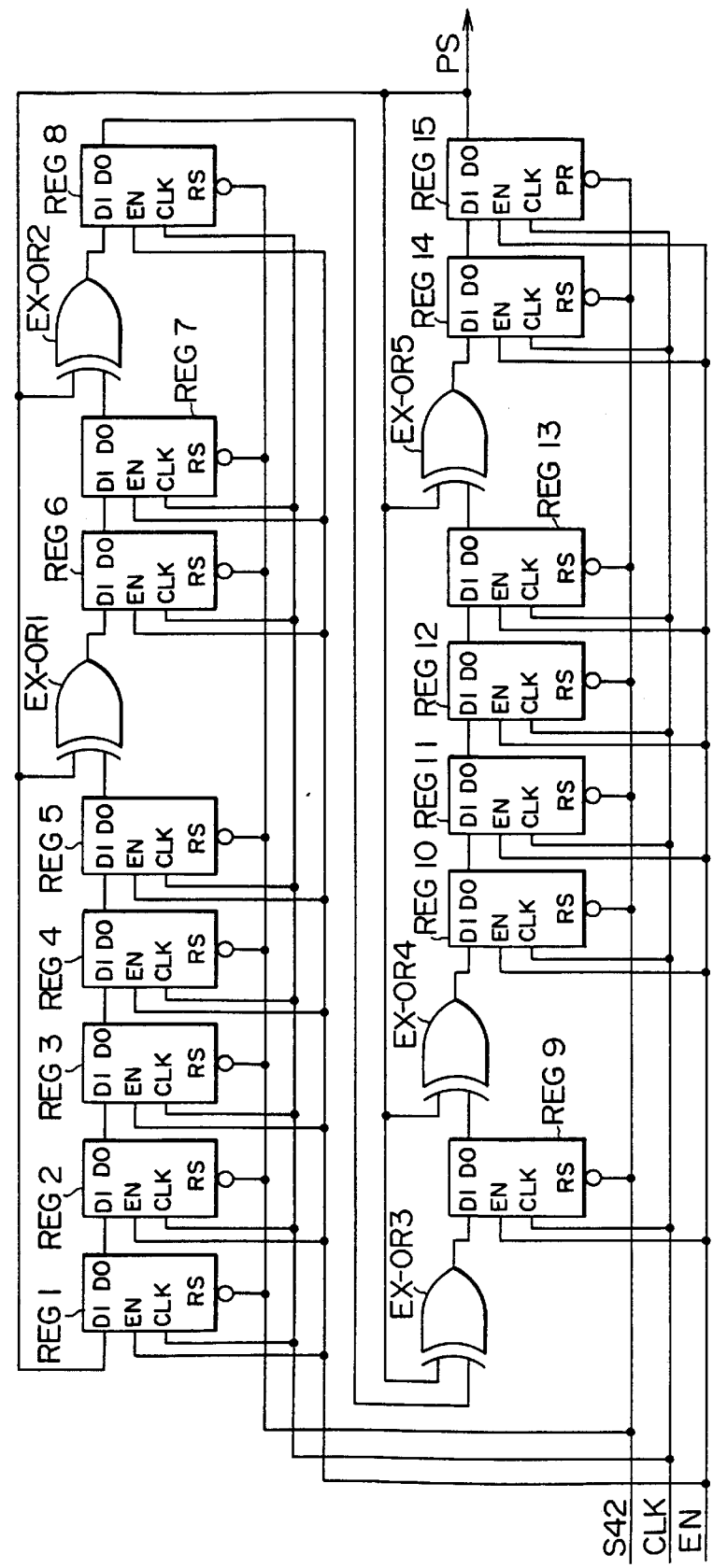
FIG. 16 is a block diagram for illustrating an example of a PN code generator used in the SS anti-duplication control signal generation section shown in FIG. 15.

FIG. 16 is a block diagram for illustrating one example of a PN code generator which constitutes the PN code generation section of the third embodiment. The PN code generator of this example comprises 15 D-flip-flops REG1 to REG15 which constitute respectively 15 step shift register and exclusive OR circuits EX-OR1 to EX-OR5 for operating suitable tap output of the shift register. The PN code generator shown in FIG. 16 is structured so as to generate M series of codes based on the reset signal RE, clock signal CLK, and enable signal EN as described herein above.

The shift register 352 is a (n-1) bit shift register in the third embodiment, shifts the input PN code string PS1 to generate PN code strings having different phases PS2, PS3, . . . , PSn, and supplies them to the selection section 353.

The selection section 353 selects a PN code string having a phase corresponding to the control content of the anti-duplication control signal S5 out of the PN code strings PS1, PS2, PS3, . . . , PSn, and outputs it as the SS anti-duplication control signal S6.

Figures 17A, 17B:
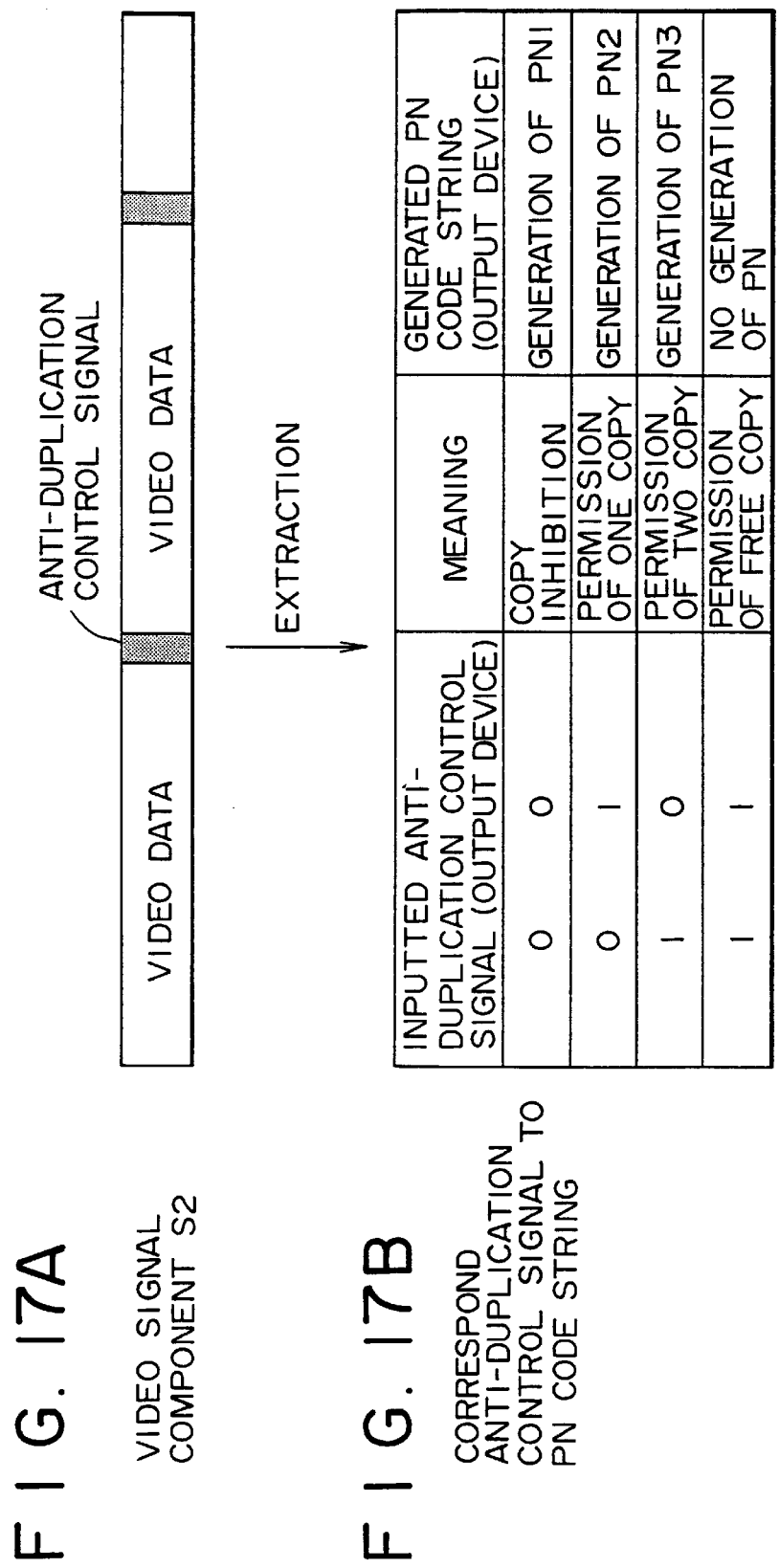
FIGS. 17A and 17B are diagrams for describing processing in the SS anti-duplication control signal generation section shown in FIG. 13.

In the third embodiment as shown in FIGS. 17A and 17B, in the case that the anti-duplication control signal S5 extracted from the video signal component S2 (refer to FIG. 17A) by the anti-duplication control signal extraction section 34 is "00" as shown in FIG. 17B which is the signal for indicating duplication inhibition, the selection section 353 of the SS anti-duplication control signal generation section 35 outputs the PN code string PS1 having a phase of 0 as the SS anti-duplication control signal S10.

Similarly, in the case that the anti-duplication control signal S5 is "01" as shown in FIG. 17B which is the signal for indicating duplication permission of the first generation, the selection section 353 of the SS anti-duplication control signal generation section 35 outputs the PN code string PS2 having a phase of 1 as the SS anti-duplication control signal S10, and alternatively, in the case that the anti-duplication control signal S5 is "10" which is the signal for indicating duplication permission of two generations of the first and second generations, the selection section 353 of the SS anti-duplication control signal generation section 35 outputs the PN code string PS3 having a phase of 2 as the SS anti-duplication control signal S10. Further in the case that the anti-duplication control signal S5 is "11" which is the signal for indicating free duplication permission, the selection section 353 of the SS anti-duplication control signal generation section 35 does not output the PN code string so that the SS anti-duplication control signal is not superimposed on the video signal.

The SS anti-duplication control signal S10 outputted from the SS anti-duplication control signal generation section 35 is supplied to the D/A conversion circuit 193 which is operated in response to the timing signal S43, outputs and supplies an analog SS anti-duplication control signal S11 to the addition section 13.

As the result, when the video signal recorded in the disk 100 is played back, the analog video signal S12 is generated by superimposing the SS anti-duplication control signal S11 on the analog video signal S4, outputted from the output device 50, and supplied to a monitor receiver for displaying a picture or a recording device for recording the video signal in a recording medium.

Figure 18:
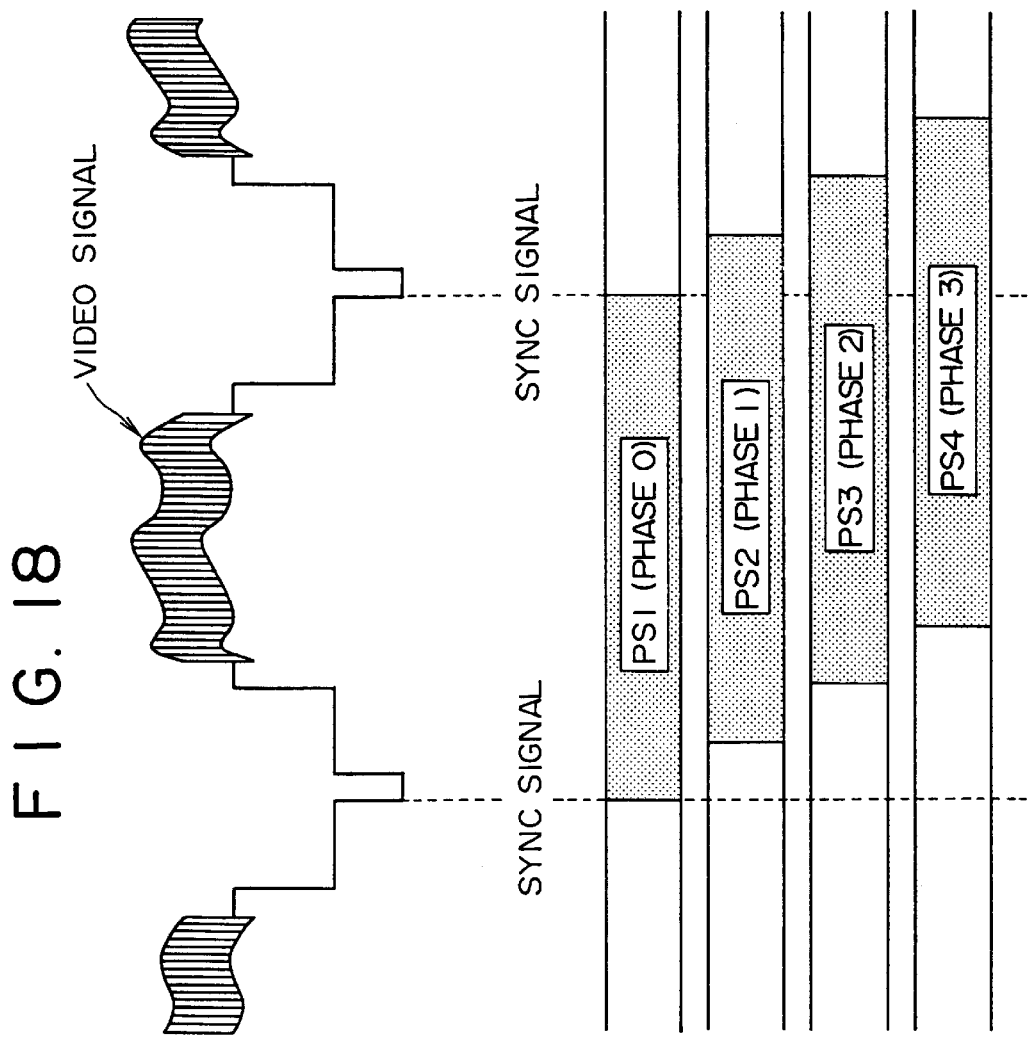
FIG. 18 is a diagram for describing the relation between the PN code having different phases generated in the SS anti-duplication control signal generation section shown in FIG. 13 and the video signal used as the information signal on which the PN code is superimposed.

Hence in the third embodiment, as shown in FIG. 18, one of PN code strings having different phases PS1, PS2, . . . , PSn generated with reference to the front end of the vertical sync signal corresponding to the control content which the anti-duplication control signal S5 indicates is outputted as the SS anti-duplication control signal and superimposed on the video signal.

Therefore, the recording device described hereinafter for receiving the video signal outputted from the output device 50 of the third embodiment judges the content of the duplication prevention control by detecting the phase of the SS anti-duplication control signal S11 superimposed on the video signal.

Further, by using the PN code string having a different phase as described herein above, a plurality of SS anti-duplication control signals can be superimposed on the same time interval of the video signal. In this case, by using the PN code string having a different phase, the respective SS anti-duplication control signals superimposed on the same time interval of the video signal can be extracted easily.

As the result as described herein above, in the case that the anti-duplication control signal indicates generation restriction and duplication is performed using a recording medium of second or higher generation, if a plurality of PN code strings having different phases is superimposed on the same time interval of the video signal supplied to the recording device side, the respective PN code strings are extracted, and the strictest control content of the duplication prevention control which is determined correspondingly to the phase of the detected PN code string is decided to be the newest control content.

The anti-duplication control signal extraction section 34, SS anti-duplication control signal generation section 35, and D/A conversion circuit 193 controls processing start timing based on the timing signals S41, S42, and S43 generated by the timing generation section 16 based on the played back analog video signal S4 and clock signal CLK, and hence the failure such as deviation of processing timing will not occur in the processing sections.

Next, a recording device for receiving the video signal outputted from the above-mentioned output device 50 and for recording the video signal is described.

Figure 19:
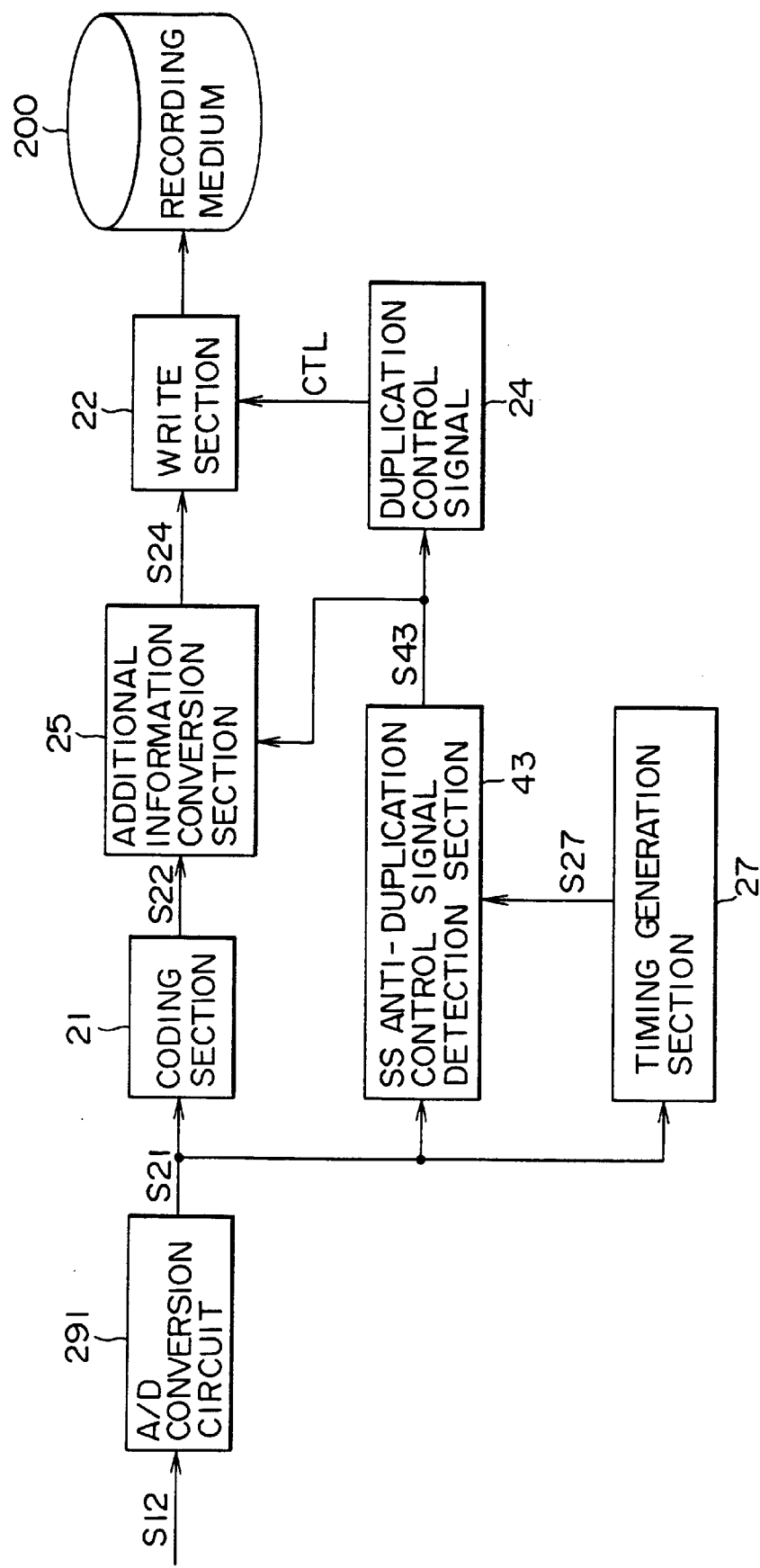
FIG. 19 is a block diagram for illustrating another example of a video signal recording device used as the information signal recording device in accordance with the present invention.

FIG. 19 is a block diagram for illustrating the recording device 60 which is served as an information signal recording device of the third embodiment.

As shown in FIG. 19, the recording device 60 is provided with a coding section 21, write section 22, duplication control section 24, additional information conversion section 25, SS anti-duplication control signal detection section 43, A/D conversion circuit 291, and timing generation section 27. A disk 200 is a DVD in which the video signal is written by the recording device 60.

The analog video signal S12 supplied from the output device 50 is subjected to A/D conversion in the A/D conversion circuit 291, and the converted signal is supplied to the coding section 21, SS anti-duplication control signal detection section 43, and timing signal generation section 27 as the digital video signal S21.

The coding section 21 receives supply of the digital video signal S21, and performs coding processing such as removal of the video sync signal and data compression of the digital video signal to generate the digital video signal S22 for recording, and then supplies it to the additional information conversion section 25.

The timing generation section 27 has the same structure as that of timing generation section 16 in the output device 50 described herein above using FIG. 14. Herein, the timing generation section 27 is described under the assumption that the timing generation section 27 has the same structure as shown in FIG. 14.

The timing generation section 27 is provided with a reference timing detection section 161, PLL circuit 162, and timing signal generation section 163. The reference timing detection section 161 receives supply of the digital video signal containing the video sync signal supplied from the A/D conversion circuit 291 and extracts the vertical sync signal.

The PLL circuit 162 receives supply of the vertical sync signal, and generates a clock signal CLK. The clock signal generated in the PLL circuit 162 is supplied to the timing signal generation section 163 and other processing sections such as SS anti-duplication control signal detection section 43.

The timing signal generation section 163 generates a timing signal S27 to be supplied to the SS anti-duplication control signal extraction section 43 based on the vertical sync signal and clock signal CLK. In this case, the timing signal S27 is generated with reference to the front end of the vertical sync signal like the timing signal S42 generated in the above-mentioned output device 50, for example, the timing signal S27 is a signal having a period of one vertical interval synchronous with the vertical sync signal.

The SS anti-duplication control signal detection section 43 detects the PN code string which is served as the SS anti-duplication control signal contained in the video signal supplied from the output device 50 based on the timing signal S27 supplied from the timing generation section 27 and clock signal CLK.

Figure 20:
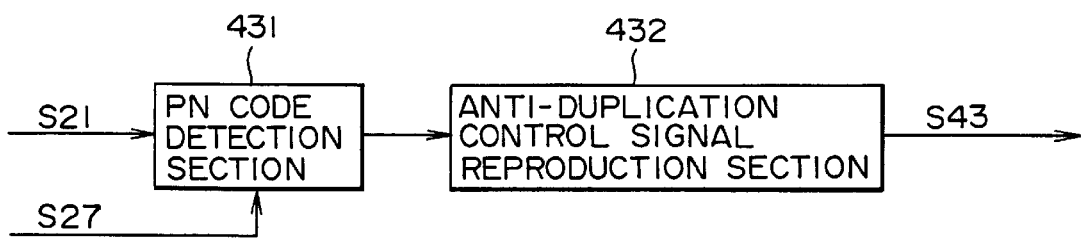
FIG. 20 is a block diagram for illustrating an SS anti-duplication control signal detection section of the video signal recording device shown in FIG. 19.

FIG. 20 is a block diagram for illustrating the SS anti-duplication control signal detection section 43. In this case, the SS anti-duplication control signal detection section 43 is corresponding to the case that the PN code string corresponding to the anti-duplication control signal S5 selected out of the plurality of PN code strings having different phases in the output device 50 described hereinbefore using FIG. 13 is used as the SS anti-duplication control signal.

As shown in FIG. 20, the SS anti-duplication control signal detection section 43 is, for example, provided with a PN code detection section 431 having a PN code generator and anti-duplication control signal reproduction section 432.

The PN code detection section 431 receives the digital signal S21 supplied from the A/D conversion circuit 291, timing signal S27, and clock signal CLK. Further, the PN code detection section 431 detects the PN code string superimposed on the digital signal S21 every timing based on the timing signal S27 using the PN code string generated in response to the clock signal CLK.

Herein, the timing signal S27 and clock signal CLK are the same signals as the timing signal S42 and clock signal CLK used in the above-mentioned output device 50. In detail, the PN code detection section 431 generates every timing based on the timing signal S27 the PN code string having the same code pattern as the PN code string used every one vertical interval correspondingly to the clock signal CLK in the SS anti-duplication control signal generation section 35 of the above-mentioned output device 50.

Further, the PN code detection section 431 detects the magnitude of correlation between the PN code string superimposed on the digital signal S21 and the PN code string generated in the PN code detection section 431. If the magnitude of the correlation detected herein is larger than a certain level, the PN code string generated in the PN code detection section 431 is decided to be the same PN code string as the PN code string superimposed on the video signal. In this case, the generation start timing of the PN code string superimposed on the digital video signal S21, namely the phase of the PN code string, is detected.

If the PN code string superimposed on the digital video signal S21 is not detected in the PN code detection section 431, the phase of the PN code string generated in the PN code detection section 431 deviates, and the detection processing of the PN code string superimposed on the video signal is repeated.

As described herein above, the phase of all the PN code strings superimposed on the digital signal S21 is detected in the PN code detection section 431, and the detection result is transmitted to the anti-duplication control signal reproduction section 432.

The anti-duplication control signal reproduction section 432 specifies the content of duplication prevention control based on the phase of the PN code string detected by the PN code detection section 431. In other words, the anti-duplication control signal reproduction section 432 generates and outputs the anti-duplication control signal S43 to be "00" if the detected phase is 0 of the PN code string superimposed on the digital video signal, generates and outputs the anti-duplication control signal to be "01" if the detected phase is 1, and generates and outputs the anti-duplication control signal to be "01" if the detected phase is 2.

Further, the anti-duplication control signal reproduction section 432 outputs the PN code string having the strictest control content out of the respective control contents of the anti-duplication control signals which the detected PN code strings having different phases indicate as the newest anti-duplication control signal if a plurality of PN code strings having different phases are detected from the digital video signal S21.

If no PN code string is detected from the digital video signal S21, the anti-duplication control signal reproduction section 232 generates an anti-duplication control signal S43 to be "11" and outputs it.

As described herein above, the anti-duplication control signal S43 outputted from the SS anti-duplication control signal detection section 43 is supplied to the duplication control section 24 and additional information conversion section 25.

The additional information conversion section 25 generates the anti-duplication control signal S43N to be added in the data string of the digital video signal S22 to be recorded in the recording medium 200 based on the anti-duplication control signal S43 supplied from the SS anti-duplication control signal detection section 43 like the output device 10 of the above-mentioned first embodiment.

In this case like in the output device 10 of the first embodiment, if the anti-duplication control signal S43 is an information which indicates generation restriction, the additional information conversion section 25 generates an information having the generation restriction information, from which 1 is subtracted, which the SS anti-duplication control signal S43 superimposed on the supplied video signal indicates as the new anti-duplication control signal S43N.

The newly generated anti-duplication control signal S43N is added on the video signal S22 to generate the video signal S24 to be recorded in the recording medium 200. The video signal S24 on which the updated anti-duplication control signal is added is supplied to the write section 22.

The duplication control section 24 generates a control signal CTL for controlling the write section 22 based on the anti-duplication control signal S43 and supplies it to the write section 22.

Thereby, the write section 22 does not write the digital video signal S24 supplied from the additional information conversion section 25 in the recording medium 200 if the control signal CTL is a signal which indicates duplication inhibition, and on the other hand, the write section 22 writes the digital video signal S24 in the disk 200 only if the control signal CTL is a signal which indicates duplication permission.

As described herein above, the recording device 60 of the third embodiment receives supply of the video signal on which the PN code string having the phase determined correspondingly to the anti-duplication control signal S5 in the output device of the third embodiment, detects the phase of the PN code string superimposed on the video signal, and then judges the content of the duplication prevention control.

As described hereinbefore, in the case that the anti-duplication control signal indicates generation restriction and duplication is performed using the recording medium of second or higher generation, if a plurality of PN code strings having different phases is superimposed on the same time interval of the video signal supplied to the recording device side, the respective PN code strings are extracted, and the strictest control content of the duplication prevention control determined correspondingly to the phase of the detected PN code string is decided to be the newest control content.

As described using FIGS. 8A and 8B, for example, in the case that each bit of the 2 bit anti-duplication control signal is spectrally spread using the PN code string generated every one vertical interval and the SS anti-duplication control signal corresponding to each bit of the anti-duplication control signal is superimposed on one vertical interval, the anti-duplication control signal can be detected at least by performing inversion spectral spread over 2 vertical intervals.

However, in the third embodiment, by performing detection processing of the PN code at most on one vertical interval, the content of the duplication prevention control can be decided dependently on the phase of the PN code string superimposed on the video signal. Hence, based on the PN code string corresponding to the control content of the anti-duplication control signal superimposed on the video signal, the content of the duplication prevention control is decided rapidly and correctly, and the duplication prevention control corresponding to the decision result is performed.

In other words, it is not required to perform detection processing of the PN code string a plurality of times correspondingly to a plurality of superimposed PN code strings having different phases, and as described herein above, in the third embodiment, by detecting successively the PN code strings with moving the phase on the video signal of one vertical interval, all the PN code strings superimposed on the video signal can be detected.

Further, the recording device 60 generates the timing signal S27 to be supplied to the SS anti-duplication control signal detection section 43 and clock signal CLK based on the vertical signal in the video signal S21 like the above-mentioned output device 50. Therefore, the same timing is used for the video signal both in the output device 50 and recording device 60, PN code string generation start timing in the output device 50 and recording device 60 is synchronized.

As the result, in the recording device 60, it is possible to generate the PN code string at the same timing as in the output device 50 with respect to the video signal, and it is not required to consume much time to detect the PN code string superimposed on the video signal.

Hence, it is not required to detect the superimposed position of the PN code string superimposed on the video signal using a sliding correlator, and the SS anti-duplication control signal is detected rapidly.

As described herein above, in the third embodiment, because the vertical sync signal is used as the reference signal in both the output device 50 and recording device 60, the spread code such as PN code string is generated at the same timing with respect to the video signal.

Therefore, in the case that the spread code generated by combining the PN code strings of different series one-to-one corresponding to the respective control contents of the duplication prevention control or one type of PN code string and one of a plurality of orthogonal codes of different types as described in the first and second embodiments is used for the third embodiment, in the recording device 60, much time is not required to match the phase of the spread code such as PN code string, the duplication prevention control corresponding to the anti-duplication control signal is performed rapidly and correctly.

The SS anti-duplication control signal generation section for generating a plurality of PN code strings of different series one-to-one corresponding to the respective control contents of the duplication prevention control described hereinbefore using FIG. 3 may be used as the SS anti-duplication control signal generation section 35 in the output device 50 of the third embodiment.

In this case, the SS anti-duplication control signal detection section which is capable of detecting a plurality of PN code strings of different series described hereinbefore using FIG. 5 is used as the SS anti-duplication control signal detection section 43 in the output device 50.

Further, the SS anti-duplication control signal generation section which generates the spread code by combining one type of PN code string one-to-one corresponding to the respective control content of the duplication prevention control and one of a plurality of orthogonal code strings described hereinbefore using FIG. 12 may be used as the SS anti-duplication control signal generation section 35 in the output device of the third embodiment.

In this case, as the SS anti-duplication control signal detection section 34 in the output device 50, the SS anti-duplication control signal detection section having the structure shown in FIG. 5 for detecting the respective spread codes generated by multiplying the PN code string generated from the PN code generation section 511 shown in FIG. 12 by the orthogonal codes generated respectively from the orthogonal code generation sections 512, 513, and 514 may be used in the respective PN code detection sections 311, 312, . . . , 31n.

In the case that the spread code generated by combining the PN code string of different series or one type of PN code string and one of a plurality of types of orthogonal codes is used so as to one-to-one correspond to the respective control contents of the duplication prevention control which the anti-duplication control signal added in the data string of the video signal recorded in the recording medium 100 indicates, the control content of the duplication prevention control is transmitted, and the content of the duplication prevention control is decided dependently on the orthogonal code used for generating the PN code string superimposed on the video signal in the recording side, and thus the duplication prevention control corresponding to the anti-duplication control signal extracted from the data string of the video signal is performed.

In the above-mentioned first, second, third embodiments, the spread code generated by multiplying the PN code string having different phases or of different series corresponding to the anti-duplication control signal or one series of PN code string and a plurality of types of orthogonal signals is outputted as the SS anti-duplication control signal, however, the present invention is by no means limited to the case.

For example, the spread code generated as described herein under may be used as the SS anti-duplication control signal.

(1) spread code generated by combining a plurality of PN code strings having different phases and one type of the orthogonal code.

(2) spread code generated by combining a plurality of PN code strings having different phases and a plurality of types of the orthogonal codes.

(3) spread code generated by combining a plurality of PN code strings of different series and one type of the orthogonal code.

(4) spread code generated by combining a plurality of PN code strings of different series and a plurality of types of the orthogonal codes.

In the case that the spread code generated by way of the above-mentioned (1) and (2), the content of the anti-duplication control signal is indicated correspondingly to the phase of the spread code with respect to the reference phase. In the case that the spread code generated by way of the above-mentioned (3) and (4), the content of the anti-duplication control signal is indicated correspondingly to the type of series. Further in the case of the above-mentioned (2) and (4), the content of the anti-duplication control signal can be indicated also correspondingly to the type of orthogonal code.

Therefore, in the case of the above-mentioned (2) and (4), it is possible to indicate the content of the anti-duplication control signal correspondingly to the difference in phase or types of series and additionally to indicate other information correspondingly to the type of orthogonal code.

Using the PN code strings generated so as to have different phases, the PN code strings generated so as to have different series, codes generated by combining one series of the PN code string and a plurality of different orthogonal codes, or spread code generated by combining a plurality of PN codes having different phases or of different series, an information such as the anti-duplication control signal may be spectrally spread, and the spectrally spread information may be superimposed on the video signal.

Figure 21:
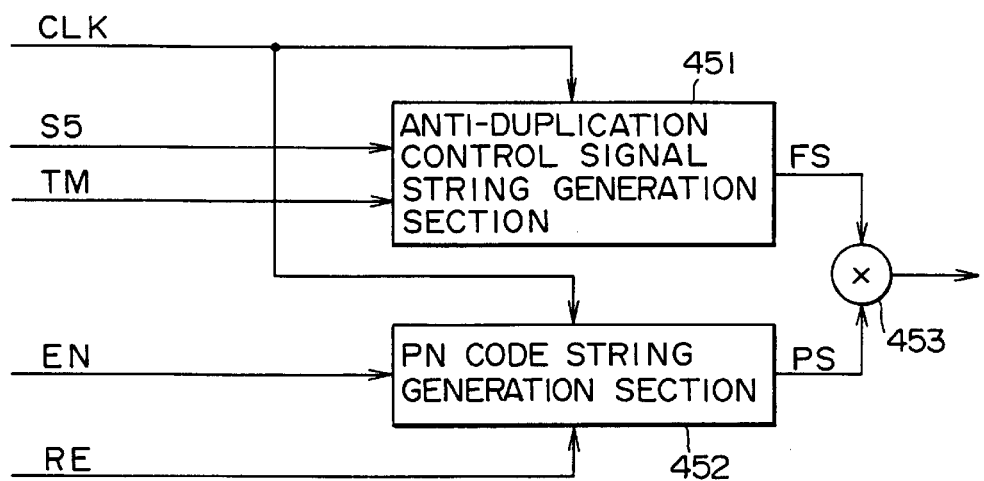
FIG. 21 is a block diagram for illustrating an exemplary structure of the SS anti-duplication control signal generation section.

In the case that the anti-duplication control signal extracted from the data string of the video signal is spectrally spread using the spread code, the SS anti-duplication control signal generation section 45 having the structure shown in FIG. 21 is used as the SS anti-duplication control signal generation sections 15 in the output devices 10 and 30, and as the SS anti-duplication control signal generation section 35 in the output device 50.

As shown in FIG. 21 in this case, the SS anti-duplication control signal generation section 45 is provided with the anti-duplication control signal string generation section 451, PN code string generation section 452, and addition section 453.

To the anti-duplication control signal string generation section 451, the clock signal CLK, anti-duplication control signal S5, and timing signal TM are supplied. To the PN code string generation section 452, the clock signal CLK, enable signal EN, and reset signal RE are supplied.

In this case, the timing signal TM indicates, for example, partition timing every 1 bit of the anti-duplication control signal S5. The enable signal EN is a signal for activating the PN code string generation section 452. The reset signal RE is a signal for generating the PN code string having a pre-determined code pattern from its head.

The anti-duplication control signal string generation section 451 generates the anti-duplication control signal string FS by outputting the anti-duplication control signal S5 every 1 bit for time period of pre-determined clocks, and supplies it to the addition section 453.

The PN code string generation section 452 is activated in response to the enable signal EN. Then, the PN code string is prepared for generation from its head based on the reset signal RE, and the PN code string generation section 452 generates the PN code string PS in response to the clock signal CLK. The generated PN code string PS is supplied to the addition section 453.

The addition section 453 spectrally spreads the anti-duplication control signal string FS using the PN code string PS. As the result, the wide-band low-level spectrally spread anti-duplication control signal (SS anti-duplication control signal) is generated.

The SS anti-duplication control signal generation section described using FIG. 3, FIG. 12, and FIG. 15 may be used as the PN code string generation section 452 of the SS anti-duplication control signal generation section 45 shown in FIG. 21.

Thereby, in the case that the SS anti-duplication control signal generation section shown in FIG. 3 is used as the PN code string generation section 452, the anti-duplication control signal S5 is spectrally spread using the PN code string generated so as to have different phases one-to-one corresponding to the respective control contents of the duplication prevention control, and the spectrally spread anti-duplication control signal is superimposed on the video signal.

Similarly, in the case that the SS anti-duplication control signal generation section shown in FIG. 15 is used as the PN code string generation section 452, the anti-duplication control signal S5 is spectrally spread using the spread code generated by combining the PN code strings generated so as to be of different series one-to-one corresponding to the respective control contents of the duplication prevention control or one type of the PN code string and a plurality of the orthogonal codes, and the spectrally spread anti-duplication control signal is superimposed on the video signal.

In this case, not only information such as the content of the duplication prevention control is indicated depending on the difference in phase or series used as the spread code or difference in type of the used orthogonal code, but also information spectrally spread by the spread code is superimposed on the video signal and transmitted. In other words, information to be transmitted can be increased.

In this case, in the receiving side, the spread code used for spectral spread is detected and subjected to inversion spectral spread, thereby, the spectrally spread information is extracted.

Figure 22:
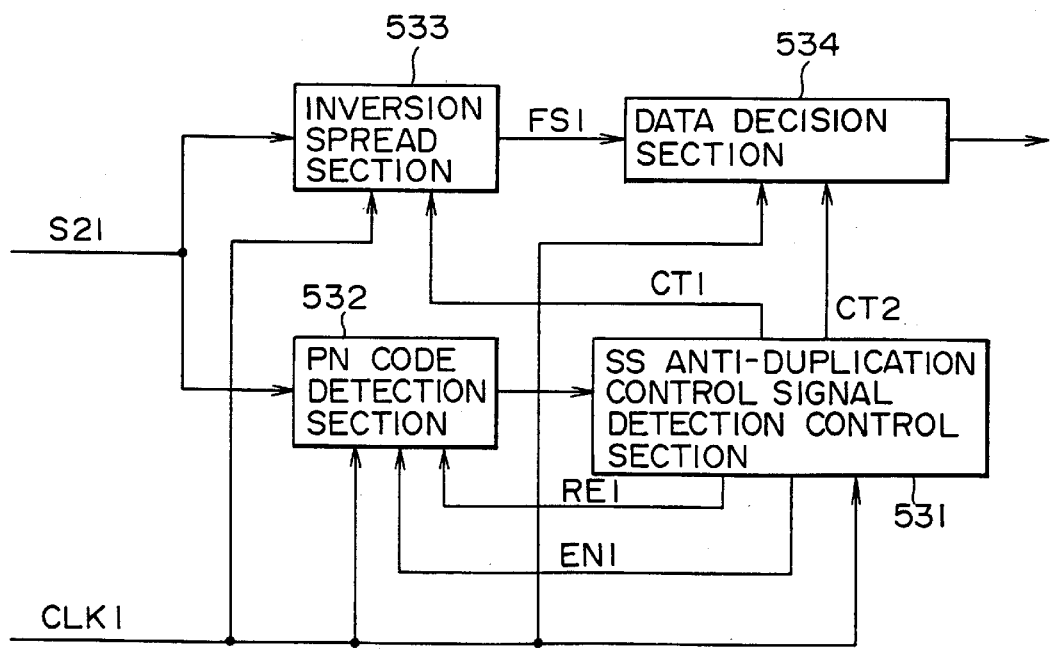
FIG. 22 is a block diagram for illustrating an exemplary structure of the SS anti-duplication control signal detection section.

FIG. 22 is a block diagram for illustrating the structure of the SS anti-duplication control signal detection section 53 used in the case that the SS anti-duplication control signal generated by multiplying the spread code is detected using the SS anti-duplication control signal generation section shown in FIG. 21. The SS anti-duplication control signal detection section 53 is used as the SS anti-duplication control signal detection section in the recording devices 20, 40, and 60.

As shown in FIG. 22, the SS anti-duplication control signal detection section of this example is provided with a SS anti-duplication control signal detection control section 531, a PN code detection section 532 for detecting the PN code which spectrally spreads the anti-duplication control signal, inversion spread section 533 for extracting the anti-duplication control signal spectrally spread from the supplied digital video signal S21, and data decision section 534 for restoring the anti-duplication control signal extracted by the inversion spread section 533 to the original anti-duplication control signal.

As shown in FIG. 22, upon receiving supply of a clock signal CLK1, the SS anti-duplication control signal detection control section 531 generates an enable signal EN1 and reset signal RE1, and supplies them to the PN code detection section 532 to control detection processing of the PN code which spectrally spreads the anti-duplication control signal.

In this embodiment, the PN code detection section 532 is structured using, for example, a sliding correlator. The PN code detection section 532 is activated in response to the enable signal EN1. The PN code detection section 532 generates a PN code string based on the clock signal CLK1 every timing corresponding to the reset signal RE1.

The PN code detection section 532 detects the PN code string which spectrally spreads the anti-duplication control signal by determining correlation to the PN code string which spectrally spreads the generated PN code string and the anti-duplication control signal.

Dependently on the result of determination of correlation between the PN code string generated in the PN code detection section 532 and the PN code string which spectrally spreads the anti-duplication control signal, the PN code detection section 532 outputs a high level signal if the correlation is high, or outputs a low level signal if the correlation is low.

Upon receiving supply of a signal which indicates the determined correlation result from the PN code detection section 532, the SS anti-duplication control signal detection control section 531 judges the detected PN code string to be the PN code string which spectrally spreads the anti-duplication control signal if the received signal is a signal having a level higher than a pre-determined level because the PN code string which spectrally spreads the anti-duplication control signal is synchronous with the PN code string generated in the PN code detection section 532. Conversely, the signal supplied from the PN code detection section 532 has a level lower than the pre-determined level, the PN code string which spectrally spreads the anti-duplication control signal is decided to be not synchronous with the PN code string generated in the PN code detection section.

If the PN code string which spectrally spreads the anti-duplication control signal is not detected in the PN code detection section 532, the phase of the PN code string generated in the PN code detection section 532 is adjusted, and detection processing of the PN code string is repeated.

If the PN code string which spectrally spreads the anti-duplication control signal is detected in the PN code detection section, the SS anti-duplication control signal detection control section 531 generates a signal CT1 for controlling generation start timing of the PN code in the inversion spread section 533 correspondingly to the detection result of the PN code detection section 532, and the signal CT1 is supplied to the inversion spread section 533. Further, the SS anti-duplication control signal detection control section 531 generates a signal CT2 for controlling the data decision section 534, and supplies the signal CT2 to the data decision section 534.

The inversion spread section 533 is provided with a PN code generator and addition circuit. The inversion spread section 533 generates a PN code string corresponding to the clock signal CLK1 every time indicated by the signal CT1 supplied from the SS anti-duplication control signal detection control section 531.

Then, the inversion spread section 533 performs inversion spectral spread using the generated PN code string, and extracts the wide-band low-level anti-duplication control signal as the narrow-band high-level anti-duplication control signal string FS1 in the form of the original anti-duplication control signal. The extracted anti-duplication control signal string FS1 is supplied to the data decision section 534.

The data decision section 534 restores the extracted anti-duplication control signal string FS1 to the original anti-duplication control signal, and outputs the restored anti-duplication control signal.

The SS anti-duplication control signal detection section described using FIG. 5 and FIG. 20 is structured in the PN code string generation section 532 of the SS anti-duplication control signal detection section 55 shown in FIG. 22, and the PN code detection 532 detects the spread code such as the PN code string one-to-one corresponding to the respective duplication prevention control superimposed on the video signal 21, and judges the control content of the duplication prevention control based on the detected spread code.

An information which indicates the decided content of the duplication prevention control is generated and outputted, then, the control content of the duplication prevention control can be decided dependently on the difference in phase or series, or difference in orthogonal code used for generation of the spread code. Of course in this case, the spectrally spread anti-duplication control signal is detected by performing inversion spectral spread as described hereinbefore.

In the case that the spectrally spread anti-duplication control signal is subjected to inversion spread for extraction, the control content of the duplication prevention control can be decided based on the anti-duplication control signal detected by inversion spectral spread and the spread code generated by combining the PN code strings having different phases or of different series generated so as to one-to-one corresponding to the respective control contents of the duplication prevention control or one type of PN code string and a plurality of types of orthogonal codes.

The control content of the anti-duplication control signal is transmitted by way of the spread code generated by combining the PN code strings having different phases or of different series generated so as to one-to-one correspond to the respective control contents of the duplication prevention control or one type of PN code string and a plurality of types of orthogonal codes for performing decision of the control content of the duplication prevention control in the recording side, thus, an information other than the anti-duplication control signal is spectrally spread using these PN code strings having different phases or of different series or the spread code generated by combining the PN code strings and a plurality of orthogonal codes, and the spectrally spread information may be superimposed on the video signal.

The SS anti-duplication control signal converted to an analog signal is superimposed on the video signal after conversion to an analog signal using two D/A conversion circuit 191 and 192 in the output device 50 of the third embodiment as shown in FIG. 13, however, the present invention is by no means limited to the case.

For example, a D/A conversion circuit is provided in the rear end of the addition section 13, and the digital signal on which the digital SS anti-duplication control signal is superimposed may be subjected to D/A conversion. Thereby only one D/A conversion circuit is sufficient for operation.

The timing generation section 16 receives supply of the video signal S4 converted to an analog signal by the D/A conversion circuit 191 in the output device 50 of the above-mentioned third embodiment, however, the present invention is by no means limited to the case. For example, the timing generation section 16 may receive supply of the video signal component S2 containing the video sync signal component supplied from the read out section 11.

As shown in FIG. 19, in the above-mentioned recording device 60, the case that the SS anti-duplication control signal detection section 43 and timing generation section 27 receive supply of the video signal S21 converted to the digital signal by the A/D conversion circuit 291 is described, however, the present invention is by no means limited to the case. For example, the analog video signal S12 supplied to the A/D conversion circuit 291 may be supplied to the SS anti-duplication control signal detection section 43 and timing generation section 27.

The PN code string of one time period is generated every one vertical interval synchronously with the vertical sync signal in response to the timing signals S42 and S27 synchronous with the vertical sync signal in the above-mentioned third embodiment, however, the present invention is by no means limited to the case.

For example, the PN code string having one time period of a plurality of vertical intervals such as 2 vertical intervals or 3 vertical intervals may be used, alternatively, the PN code string having one time period of a divided vertical interval into a plurality of divided vertical intervals such as ½ vertical interval or ¼ vertical interval may be used. The present invention is by no means limited to the case that the PN code string is generated synchronously with the vertical sync signal, and the PN code string generated synchronously with the horizontal sync signal may be used. Also in this case, the PN code string having one time period of a plurality of horizontal intervals may be used, or the PN code string having one time period of a divided horizontal interval into a plurality of divided horizontal intervals may be used.

The analog connection that the analog video signal is supplied from the output device to the recording device is described in the above-mentioned embodiments, however, the present invention may be applied to the case of digital connection.

In other words, the spectrally spread anti-duplication control signal is superimposed not only on an analog video signal but also on a digital video signal.

In the recording devices 20, 40, and 60, the video signal to be supplied to the SS anti-duplication control signal detection section is subjected previously to filtration to extract the low level portion of the video signal on which the spectrally spread anti-duplication control signal is superimposed, and the low level portion may be supplied to the SS anti-duplication control signal detection section.

Though the information signal for transmission is the video signal for convenience of description in the above-mentioned first, second, and third embodiments, however, the present invention is by no means limited to the video signal. For example, the present invention is applied to the case that audio signal or data is transmitted.

The output device and recording device are DVD devices for convenience of description in the above-mentioned first, second, third embodiments, however, the present invention is by no means limited to the case, the present invention can be applied to playback devices and recording devices such as VTR, digital VTR, cassette tape and video disk, and video CD. To sum up, the present invention can be applied to analog devices such as analog VTR and also to digital devices such as DVD device.

The present invention can be applied to the output device for transmitting television signals of a broadcasting side, that is, the present invention can be applied to the case that television signals on which the spectrally spread anti-duplication control signal is superimposed is transmitted.

For example, the anti-duplication control signal is transmitted prior to transmission of a program. A reception side receives the anti-duplication control signal string transmitted previously and performs duplication prevention control of the video signal based on the anti-duplication control signal.

Of course, the present invention is applied to output devices and reception devices for transmission of analog video signals through cables like cable television system, and also applied to audio/music broadcasting such as radio broadcasting.

The anti-duplication control signal added on the video signal recorded in the recording medium 100 is extracted, and the extracted anti-duplication control signal is spectrally spread using the PN code to generate a spectrally spread anti-duplication control signal and superimposed on the video signal to be supplied to the recording device 20, recording device 40, or recording device 60 in the above-mentioned first, second, and third embodiments, however, a recording medium in which the video signal having the spectrally spread anti-duplication control signal superimposed previously thereon is recorded may be used.

In detail, a spectrally spread anti-duplication control signal one-to-one corresponding to the respective control contents of the duplication prevention control is generated, and it is superimposed on the video signal to be recorded in a recording medium. The recording medium in which the video signal having the spectrally spread anti-duplication control signal superimposed thereon is prepared.

In this case, as the spectrally spread anti-duplication control signal one-to-one corresponding to the respective contents of the duplication prevention control, the spread code generated by combining the PN code strings having different phases with respect to the reference phase, PN code strings of different series, or one type of PN code string and one of a plurality of types of orthogonal codes as described hereinbefore may be used.

Also in this case, the PN code is generated synchronously with the video sync signal, thereby in the recording device side, the PN code is generated at the same timing as the PN code which spectrally spreads the anti-duplication control signal based on the video signal.

As described herein above, in the case of the recording medium in which the video signal having the spectrally spread anti-duplication control signal superimposed previously thereon is recorded, it is not required to perform processing such as extraction of the anti-duplication control signal, generation of the PN code, spectral spread, superimposition of the spectrally spread anti-duplication control signal on the video signal in the output device.

In the case that the spectrally spread anti-duplication control signal is superimposed previously on the video signal recorded in the recording medium as described herein above, providing the recording device side functions to detect the spectrally spread anti-duplication control signal, the anti-duplication control signal superimposed previously on the video signal is extracted and the extracted anti-duplication control signal is served to perform efficiently the duplication prevention control.

An anti-duplication control signal generation section is provided to the output device, and the anti-duplication control signal generated in the output device may be superimposed on the video signal.

In this case, if no anti-duplication control signal is recorded originally in the recording medium or if no spectrally spread anti-duplication control signal is superimposed, the duplication prevention control is performed in the recording device side using the anti-duplication control signal generated and superimposed on the video signal in the output device.

In the case that the anti-duplication control signal is generated in the output device and the spectrally spread anti-duplication control signal corresponding to the anti-duplication control signal is generated, the code generated by multiplying the PN code strings having different phases or of different series or PN code by a plurality of orthogonal codes is superimposed on the video signal as the spectrally spread anti-duplication control signal as in the above-mentioned second embodiment.

Of course, the anti-duplication control signal is spectrally spread using the spread code such as the PN code, and the spectrally spread anti-duplication control signal may be superimposed on the video signal.

As described hereinbefore, according to the present invention, a plurality of spread codes having different phases or of different series one-to-one corresponding to the respective contents of the duplication prevention control or a plurality of spread codes generated by combining orthogonal codes and PN codes are superimposed on the information signal as the spectrally spread additional information.

As the result, by detecting the phase or series of the spread code superimposed on the information signal or type of orthogonal code used for generating the spread code, the control content of the duplication prevention control is decided.

Further, by using a plurality of spread codes having different phases or of different series or a plurality of spread codes generated by combining the orthogonal codes and PN codes, a plurality of information spectrally spread using these spread codes is superimposed on the same time interval and the same frequency band of the information signal.

Because the additional information spectrally spread and superimposed on the information signal can carry information including duplication generation restriction, namely the number of permitted duplications, thus such additional information leads to flexible copyright protection.

What is claimed is:

1. A superimposing device for superimposing a control signal on a main information signal and generating a combined signal, the superimposing device comprising:
   code generating means for generating selectively one of a prescribed plurality of different codes which are the same codes as a plurality of different codes generated by a code detection section and where each code of the prescribed plurality of codes corresponds to a single control code for controlling output of said main information signal from the code detection section; and
   superimposition means for superimposing said generated code on the main information signal for generating the combined information signal.

2. The superimposing device as claimed in claim 1, wherein said prescribed plurality of different codes correspond to controls for controlling a recording operation at said code detection section.

3. The superimposing device as claimed in claim 2, wherein said prescribed plurality of different codes indicates a number of permitted duplications of said main information signal on said recording medium.

4. The superimposing device as claimed in claim 1, wherein said prescribed plurality of different codes has phases that differ respectively from each other.

5. The superimposing device as claimed in claim 1, further comprising:
   means for coding an additional information signal using said code generated in said code generating means and generating a coded information signal,
   wherein said superimposition means superimposes said generated code by superimposing said coded information signal in said main information signal.

6. An information signal duplication control system as claimed in claim 1, wherein each of said prescribed plurality of different codes has a series that differ respectively from each other.

7. The superimposing device as claimed in claim 5, wherein said code generation means selectively outputs one of a prescribed plurality of different spread codes, and said means for coding processes a spread coding of the additional information signal using the selected spread code.

8. The superimposing device as claimed in claim 7 wherein said additional information signal is an anti-duplication control signal for controlling the recording operation on the detector.

9. The superimposing device as claimed in claim 5 wherein said code generation means includes
   means for generating the prescribed plurality of codes each having a different respective series; and
   means for outputting selectively one of said prescribed plurality of codes corresponding to a desired control.

10. The superimposing device as claimed in claim 1 wherein said prescribed plurality of different codes are generated based on a specified code and a plurality of different orthogonal codes.

11. The superimposing device as claimed in claim 10, wherein each of said prescribe plurality of different codes is generated by multiplying the specified code by one of the plurality of different orthogonal codes.

12. The superimposing device as claimed in claim 11, wherein said code generation means further includes:
   means for generating a specified code;
   means for generating a prescribed plurality of orthogonal codes;
   means for receiving said prescribed plurality of orthogonal codes supplied from said means for generating and outputting selectively one of said prescribed plurality of orthogonal codes corresponding to a desired control of said main information signal; and means for multiplying the orthogonal code supplied from said means for receiving by said specified code.

13. The superimposing device as claimed in claim 1, wherein:

said code generation means selectively outputs one of a prescribed plurality of different pseudo random noise codes.

14. A detecting device for detecting a code superimposed on the main information signal from a combined signal, the device comprising:

code detection means for receiving said combined signal and detecting said code from the combined information signal using a prescribed plurality of different codes each corresponding to a single control code for controlling output of said main information signal; and controlling means for controlling the output of said main information signal based on said code detected by the code detection means and said control code corresponding thereto.

15. The detecting device as claimed in claim 14, wherein:

said prescribed plurality of different codes correspond to the control codes of controlling recording on a recording medium, and said controlling means controls recording of said main information signal on the recording medium based on the code detected by said detection means.

16. The detecting device as claimed in claim 14, wherein said prescribed plurality of different codes indicates a number of permitted duplications of said main information signal on said recording medium.

17. The detecting devices as claimed in claim 14, wherein:

said code detection means detects said code from the combined information signal using said prescribed plurality of different codes and extracts an additional information superimposed on the main information signal.

18. The detecting device as claimed in claim 17, wherein:

said code detection means detects said code from the combined information signal by processing an inverse spread coding to the combined signal using a prescribed plurality of different spread codes corresponding to the control codes for controlling output of said main information signal.

19. The detecting devices as claimed in claim 18, wherein:

said code detection means detects said by processing an inverse spread spectrum process to the combined signal using said spread code.

20. The detecting device as claimed in claim 17, wherein said additional information signal is a control signal for controlling a recording operation on a recording medium.

21. The detecting device as claimed in claim 14, wherein said prescribed plurality of different codes have phases that differ respectively from each other.

22. The detecting device as claimed in claim 14, wherein each of said prescribed plurality of different codes has a series that differ respectively from each other.

23. The detecting device as claimed in claim 14, wherein said prescribed plurality of different codes are generated based on a specified code and a plurality of different orthogonal codes.

24. The detecting device as claimed in claim 23, wherein each of said prescribed plurality of different codes is generated by multiplying the specified code by one of the plurality of different orthogonal codes.

25. The detecting device as claimed in claim 14, wherein:

each of said prescribed plurality of different codes is a pseudo random noise code that differ respectively from each other.

26. The detecting device as claimed in claim 14, wherein:

said detection means detects said code by processing detection processes of each of said prescribed plurality of different codes in parallel.

27. A superimposing method for superimposing a control signal on a main information signal and generating a combined signal, the superimposing method comprising the steps of:

generating selectively one of a prescribed plurality of different codes which are the same codes as a plurality of different codes generated by a detector and where each code of the prescribed plurality of codes corresponds to a single control for controlling output of said main information signal; and superimposing said generated code on the main information signal to generate the combined signal.

28. The superimposing method as claimed in claim 27, wherein:

said prescribed plurality of different codes correspond to controls for controlling a recording operation on the detector.

29. The superimposing method as claimed in claim 28, wherein said prescribed plurality of different codes indicates a number of permitted duplications of said main information signal on a recording medium.

30. The superimposing method as claimed in claim 27, further comprising the steps of:

coding an additional information signal using said code generated in said code generating step and generating a coded information signal, wherein said coded information signal is superimposed in said main information signal.

31. The superimposing method as claimed in claim 30, wherein:

said code generating step selectively outputs one of a prescribed plurality of different spread codes; and processing a spread coding of the additional information signal using the spread code.

32. The superimposing method as claimed in claim 31, wherein:

said step of processing includes processing a spread spectrum process of the additional information signal using the spread code.

33. The superimposing method as claimed in claim 30, wherein: said additional information signal is an anti-duplication control signal for controlling a recording operation on the detector.

34. The superimposing method as claimed in claim 27, wherein said prescribed plurality of different codes have phases that differ respectively from each other.

35. The superimposing method as claimed in claim 27, wherein each of said prescribed plurality of different codes has a series that differ respectively from each other.

36. The superimposing method as claimed in claim 35, wherein said generating step includes generating a prescribed plurality of codes each having a different respective series and outputting selectively one of said plurality of codes corresponding to a desired control.

37. The superimposing method as claimed in claim 27, wherein said prescribed plurality of different codes are generated based on a specified code and a plurality of different orthogonal codes.

38. The superimposing method as claimed in claim 37, wherein each of said prescribed plurality of different codes is generated by multiplying the specified code by one of the plurality of different orthogonal codes.

39. The superimposing method as claimed in claim 38, wherein said generating step further includes:

generating a specified code;

generating a prescribed plurality of orthogonal codes;

receiving said plurality of orthogonal codes and outputting selectively one of said plurality of orthogonal codes corresponding to control codes of said main information signal on a detector; and multiplying the orthogonal code supplied from said selection means by said specified code.

40. The superimposing method as claimed in claim 27, wherein:

said generating step selectively outputs one of a prescribed plurality of different pseudo random noise codes.

41. A detecting method for detecting a code superimposed on a main information signal from a combined signal, the method comprising the steps of:

receiving said combined signal and detecting said code from the combined information signal using a prescribed plurality of different codes where each code of said prescribed plurality of codes corresponds to a single code used for controlling output of said main information signal; and controlling the output of said main information signal based on said code detected by the step of receiving and detecting and the code corresponding thereto.

42. The detecting method as claimed in claim 41, wherein:

said prescribed plurality of different codes correspond to the control codes for controlling recording on a recording medium, and said step of controlling controls recording of said main information signal on the recording medium based on the code detected by the step of detecting.

43. The detecting method as claimed in claim 42, wherein said prescribed plurality of different codes indicates a number of permitted duplications of said main information signal on said recording medium.

44. The detecting method as claimed in claim 41, wherein:

said step of detecting detects said code from the combined information signal using said prescribed plurality of different codes and extracts an additional information superimposed on the main information.

45. The detecting method as claimed in claim 44, wherein:

said step of detecting detects said code from the combined information signal by processing an inverse spread coding to the combined signal using a prescribed plurality of different spread codes corresponding to the control codes for controlling output of said main information signal.

46. The detecting method as claimed in claim 44, wherein said step of detecting detects said code by processing an inverse spread spectrum process to the combined signal using a spread code.

47. The detecting method as claimed in claim 44, wherein said additional information signal is a control signal for controlling the recording operation on a recording medium.

48. The detecting method as claimed in claim 41, wherein said prescribed plurality of different codes have phase that differ respectively from each other.

49. The detecting method as claimed in claim 41, wherein each of said prescribed plurality of different codes has a series that differ respectively from each other.

50. The detecting method as claimed in claim 41, wherein said prescribed plurality of different codes are generated based on a specified code and a plurality of different orthogonal codes.

51. The detecting method as claimed in claim 50, wherein each of said prescribed plurality of different codes is generated by multiplying the specified code by one of the plurality of different orthogonal codes.

52. The detecting method as claimed in claim 41, wherein:

each of said prescribed plurality of different codes is a pseudo random noise code that differ respectively from each other.

53. The detecting method as claimed in claim 41, wherein:

said step of detecting detects said code by processing detection processes of each of said prescribed plurality of different codes in parallel.

* * * * *